(12) United States Patent
Takahashi et al.

(10) Patent No.: US 6,272,414 B1
(45) Date of Patent: Aug. 7, 2001

(54) ENGINE-CVT DRIVE TRAIN CONTROL SYSTEM

(75) Inventors: Nobutaka Takahashi, Yokohama; Keisuke Suzuki, Kanagawa; Hideo Nakamura, Tokyo; Hiroyuki Ashizawa, Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/215,335

(22) Filed: Dec. 18, 1998

(30) Foreign Application Priority Data

Dec. 19, 1997 (JP) .................................................. 9-350874

(51) Int. Cl.[7] ...................................................... G06F 7/00
(52) U.S. Cl. ................................ 701/54; 477/111; 701/84
(58) Field of Search ................................. 701/51, 54, 58, 701/61, 64–66, 84; 477/43, 46–49, 64, 65, 84, 101, 102, 109–111, 169; 476/3, 4, 10, 11

(56) References Cited

U.S. PATENT DOCUMENTS

| | | | |
|---|---|---|---|
| 5,027,669 | 7/1991 | Nakano | 476/41 |
| 5,052,236 | 10/1991 | Nakano | 74/733.1 |
| 5,067,360 | 11/1991 | Nakano | 476/10 |
| 5,083,473 | 1/1992 | Nakano | 476/10 |
| 5,305,662 | 4/1994 | Togai et al. | 74/866 |
| 5,707,313 | 1/1998 | Suzuki | 477/43 |
| 5,790,968 | 8/1998 | Kashiwabara et al. | 701/51 |
| 5,816,976 | * 10/1998 | Kuroiwa et al. | 477/102 |
| 5,928,301 | * 7/1999 | Soga et al. | 701/51 |
| 5,976,054 | * 11/1999 | Yasuoka | 477/48 |

FOREIGN PATENT DOCUMENTS

| | | |
|---|---|---|
| 0 530 381 A1 | 3/1993 | (EP) . |
| 0 953 469 A2 | 11/1999 | (EP) . |
| 7-239002 | 9/1995 | (JP) . |
| 8-177541 | 7/1996 | (JP) . |

OTHER PUBLICATIONS

H. Kumura et al., "Performance of a Dual–Cavity Half Toroidal CVT for Passenger Cars", International Conference on Continuously Variable Power Transmissions, (Sep. 1996); pp. 135–140.

Brian D.O. Anderson, "Controller Reduction: Concepts and Approaches", IEEE Transactions on Automotive Control, vol. 34, No. 8, Aug. 1989, pp. 802–812.

* cited by examiner

Primary Examiner—William A. Cuchlinski, Jr.
Assistant Examiner—Edward Pipala
(74) Attorney, Agent, or Firm—Foley & Lardner

(57) ABSTRACT

A control system for an engine-CVT drive train controls engine torque change against inertia torque that would take place during ratio change due to inertia attached to the CVT input shaft. A target speed is computed from operator power demand and vehicle speed. A target ratio is computed from the target speed and vehicle speed. A ratio command is computed from the target ratio. The control system computes the inertia torque from the ratio command or the target ratio.

28 Claims, 25 Drawing Sheets

ENGINE-CVT DRIVE TRAIN CONTROL SYSTEM

FIELD OF THE INVENTION

The present invention relates to drive train control systems for automotive vehicles, and more particularly to drive train control systems for automotive drive trains including an engine and a continuously variable transmission (CVT).

BACKGROUND OF THE INVENTION

In the following description, the term "engine" is herein used to mean an internal combustion engine, an electric motor and a hybrid power unit that includes an internal combustion engine and an electric motor.

In an automotive drive train including an engine and a CVT, varying a CVT ratio, i.e., a ratio=(input speed)/(output speed), brings about the following phenomena.

(1) At acceleration, varying a CVT ratio in a shift-down direction causes a drop in drive torque for acceleration during a period of shifting owing to an increase in equivalent inertia in drive train, failing to meet power demand for acceleration.

(2) During a shift from acceleration mode to an ordinary drive mode, varying CVT ratio in a shift-up direction causes an increase in drive torque for acceleration during a period of shifting owing to a reduction in equivalent inertia in drive train, providing an unexpected acceleration feel to the vehicle driver.

U.S. Pat. No. 5,790,968 (JP-A 7-239002) discloses a CVT ratio rate control system that controls a CVT ratio rate (=speed at which CVT ratio changes) based on consideration of change in inertia torque, that is, apparent torque derived due to changes in equivalent inertia. This known CVT control system adjusts CVT ratio rate in response to an output speed of CVT in such a manner as to restrain inertia torque from exceeding a predetermined value.

JP-A 8-177541 discloses an engine torque control system for an engine-CVT drive train. According to this known engine control system, upon occurrence of a downshift command for acceleration, a ratio rate due to the downshift is anticipated and a drop, in amount, of engine torque is anticipated based on the anticipated ratio rate. During a period between the downshift command and the subsequent initiation of ratio change, the engine ignition timing is retarded in accordance with the anticipated drop of engine torque for a reduction of the engine torque. After initiation of the ratio change in the downshift direction, the amount of the ignition timing retard is gradually reduced in accordance with the actual CVT ratio rate. This control is intended to provide smooth increase in engine torque upon acceleration.

The known CVT ratio rate control system may not sufficiently meet driver's acceleration demand because drop in CVT ratio rate to suppress inertia torque causes slow acceleration during CVT ratio change in downshift direction.

Thus, it would be desired to make compensation for reduction in inertia torque with CVT ratio rate maintained to meet driver's acceleration demand.

Inertia torque $\Delta Te\_inertia$, which is derived from changes in equivalent inertia in engine caused by CVT ratio changes, can be expressed as, $$\Delta Te\_\text{inertia} = J1 \cdot \omega_w \cdot Gf \cdot (dG/dt) \qquad \text{Eq. 1}$$

where:

J1 is moment of inertia of the CVT input shaft due to masses of engine and intermediate components between the engine and the CVT input shaft, Gf is a final drive reduction ratio, $\omega_w$ is angular speed of a wheel driven by the final drive, and G is a ratio that is a speed ratio between the CVT input and output shafts.

Variations of the speeds of input and output shafts of CVT are measured for calculation of CVT ratio. These measured values of the speeds may involve measurement errors and noises that are not predictable and difficult to remove by the present technology. Deviations of calculated values of the CVT ratio from variations of the CVT ratio are subject to such measurement errors and noises. Unless appropriately processed, the calculated values of the CVT ratio cannot be regarded as G in the equation (1). If these values are substituted for G, calculated values of dG/dt are greatly deviated from variations of dG/dt, causing great deviations of calculated values of $T_I$ from variations of $T_I$. Thus, using the calculated values of $T_I$ in altering engine torque will fail to meet driver's acceleration demand during downshift for acceleration.

FIGS. 8 to 13 show simulation results. In FIG. 8, the reference character A shows plotting of simulated measures resulting from superimposing random noise with the probability density of the normal distribution, where variance is 0.01, upon real variations of CVT ratio from 1 to 2 against time over period of 2 seconds. In FIG. 9(A), a curve B connects values resulting from repeating subtraction of a previously sampled old value of the real variations of CVT ratio from a currently sampled new value thereof over 0 to 2 seconds. In FIG. 9(B), the reference character C shows plotting of values resulting from repeating subtraction of a previously sampled old value of the measures in FIG. 8 from a currently sampled new value thereof over 0 to 2 seconds. The values shown in FIG. 9(A) may be regarded as dG/dt, where the real variations are substituted for G in equation (1). The values shown in FIG. 9(B) may be regarded as dG/dt, where the simulated measures shown in FIG. 8 are substituted for G in equation (1). Comparing FIG. 9(B) with FIG. 9(A) reveals that the values of FIG. 9($a$) deviates from the corresponding values of FIG. 9(B) too much to represent the real variations of dG/dt. This means that values resulting from calculating equation (1) after substitution of the values of FIG. 9(B) for dG/dt will fail to represent real variations of the inertia torque $\Delta Te\_inertia$.

Filters are often used to process measures for removal or at least reduction of noise component.

In FIG. 10, a curve as indicated by the reference character a shows real variations of the CVT ratio from 1 to 2 over a period of 2 seconds, while a curve indicated by the reference character b shows values resulting from filtering the real variations. Comparing the curve b with the curve a clearly shows that the filtering has caused a phase shift.

The measures of the CVT ratio as shown at A in FIG. 8 are subjected to the filtering process to give filtered measures. In FIG. 11, the reference character Cl shows plotting of values resulting from repeating subtraction of a previously sampled old value of the filtered measures from a currently sampled new value thereof over 2 seconds. The curve B in FIG. 9(A) is drawn in FIG. 11 for comparison with the plotting Cl. Comparing the plotting Cl in FIG. 11 with the plotting C in FIG. 9(B) reveals that the noise component has been reduced. However, the values on the plotting Cl shown in FIG. 11 still suffer from undesired variations, so that they cannot be used as substitution for dG/dt in the equation (1).

FIGS. 12 and 13 illustrate test results from signal processing with another filter, which has a different characteristic.

In FIG. 12, a curve a shows real variations of the CVT ratio from 1 to 2 over a period of 2 seconds, while a curve indicated by the reference character b1 shows values resulting from filtering the real variations. Comparing the curve b1 with the curve b shown in FIG. 10 clearly shows that this filtering has caused a greater phase shift.

The measures of the CVT ratio as shown at A in FIG. 8 are subjected to the filtering by this another filter to give filtered measures. In FIG. 13, the reference character C2 shows plotting of values resulting from repeating subtraction of a previously sampled old value of the filtered measures from a currently sampled new value thereof over 2 seconds. The curve B of FIG. 9(A) is drawn in FIG. 13 for comparison with the plotting C2. Comparing the plotting C2 in FIG. 13 with the plotting C1 in FIG. 11 reveals that the noise component has been reduced. However, the deviation from the curve B has increased, so that the values on the plotting C2 cannot be used as substitution for dG/dt in the equation (1).

There is a need to meet driver's demand or expectation for vehicle performance during variations of CVT ratio. An object of the present invention therefore is to improve a control system for a vehicle drive train including an engine and a CVT such that the above-mentioned need is fulfilled.

SUMMARY OF THE INVENTION

According to one aspect of the present invention, there is provided a drive train control system including an engine having various engine speeds and a torque control element operable in response to a first control signal to control engine torque, a CVT including a ratio control arrangement having an actuator activated in response to a second control signal to establish various speed ratios between input and output shafts of the CVT, and a controller outputting the first and second control signals, the controller including a target ratio generator to generate a target ratio, an inertia torque generator to generate an inertia torque from the target ratio and a correction generator to generate a correction required to get engine torque change against the inertia torque, the controller generating the first control signal in response to the correction.

According to another aspect of the present invention, there is provided a method for a vehicle drive train including an engine having various engine speeds and a torque control element operable in response to a first control signal to control engine torque, a CVT including a ratio control arrangement having an actuator activated in response to a second control signal to establish various speed ratios between input and output shafts of the CVT, and a controller for outputting the first and second control signals, the control method comprising the steps of:

generating a target ratio, generating an inertia torque from the target ratio, generating a correction required to get engine torque change against the inertia torque, and generating the first control signal in response to the correction.

According to still another aspect of the present invention, there is provided a drive train control system including an engine having various engine speeds and a torque control element operable in response to a first control signal to control engine torque, a CVT including a ratio control arrangement having an actuator activated in response to a second control signal to establish various speed ratios between input and output shafts of the CVT, and a controller outputting the first and second control signals, the controller including a target ratio generator to generate a target ratio, a target engine torque compensating magnitude generator to generate a target engine torque compensating magnitude and a correction generator to generate a correction required to get the target engine torque compensating magnitude, the controller generating the first control signal in response to the correction, wherein the target engine torque compensating magnitude generator has a pseudo-differential filter extracted to make phase adjustment between inertia torque and inertia torque compensating magnitude and applies the pseudo differential to the target ratio in computing the target engine torque compensating magnitude.

According to further aspect of the present invention, there is provided a drive train control system including an engine having various engine speeds and a torque control element operable in response to a first control signal to control engine torque, a CVT including a ratio control arrangement having an actuator activated in response to a second control signal to establish various speed ratios between input and output shafts of the CVT, and a controller outputting the first and second control signals, the controller including a target ratio generator to generate a target ratio, a ratio command generator to generate a ratio command from the target ratio, a target engine torque compensating magnitude generator to generate a target engine torque compensating magnitude and a correction generator to generate a correction required to get the target engine torque compensating magnitude, the controller generating the first control signal in response to the correction, wherein the target engine torque compensating magnitude generator has a pseudo-differential filter extracted to make phase adjustment between inertia torque and inertia torque compensating magnitude and applies the pseudo differential to the ratio command in computing the target engine torque compensating magnitude.

DESCRIPTION OF THE PREFERRED EMBODIMENTS

Figure 1:
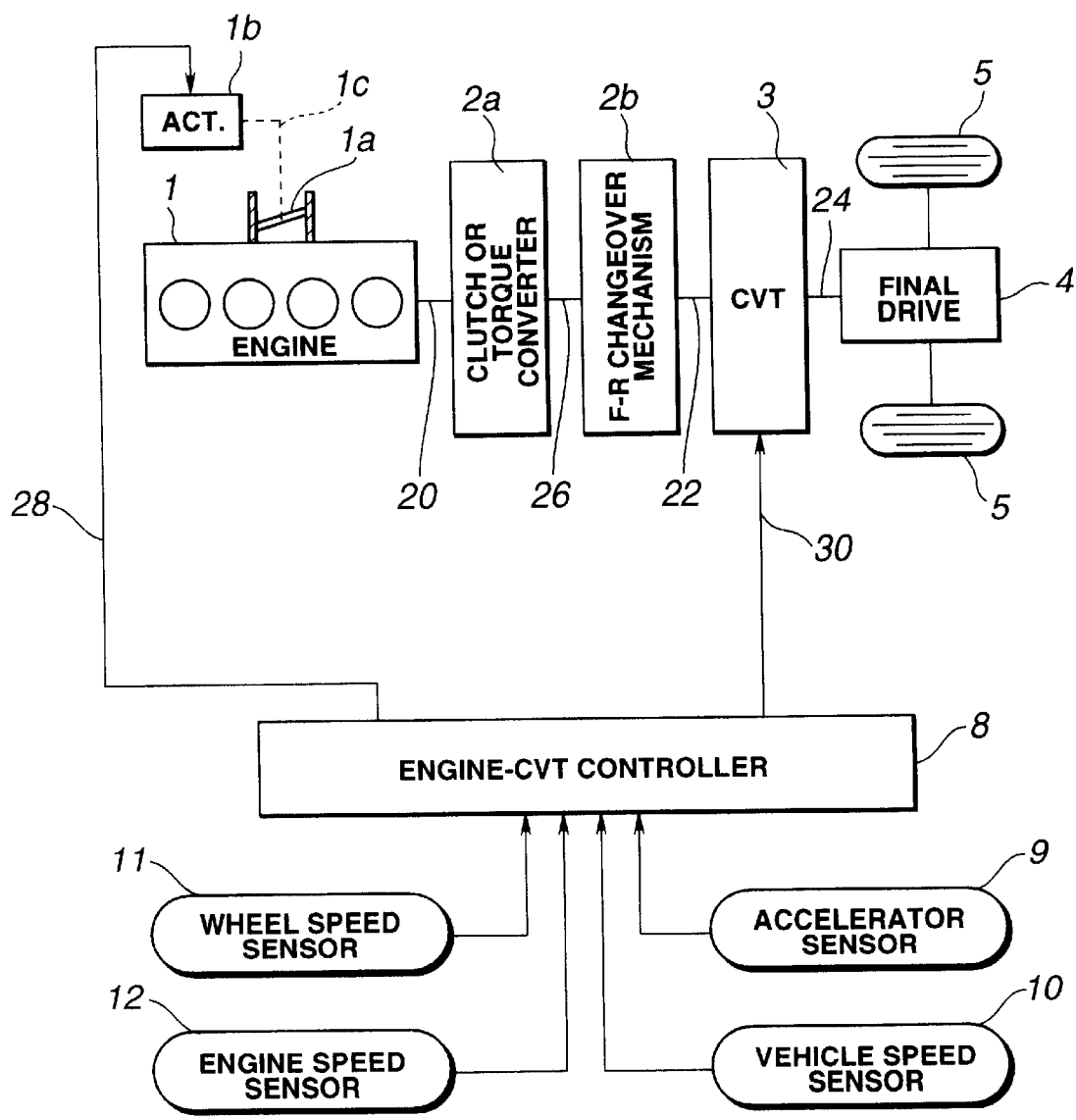
FIG. 1 is a block diagram showing the relationship between a controller and a vehicle drive train including an engine and a CVT.

FIG. 1 illustrates an engine-CVT drive train for a passenger automotive vehicle with a manually operable accelerator or gas pedal that has various depressed positions in response to varying operator power demand. The drive train includes an engine 1 and a continuously variable transmission (CVT) 3. It will be understood that the present invention is operational with any type of engine whose torque output can be controlled, including a gasoline engine, a diesel engine, an electric motor, and hybrid power unit. The present invention is operational with any type of CVT in which ratio rate can be controlled, including hydrostatic and friction CVTs. Examples of the friction CVTs are a V-belt CVT with a V-belt interconnecting an input pulley and an output pulley and a toroidal CVT with friction rollers between and in engagement with a set of coaxial toric input and output discs.

A torque control element controls the torque output of the engine 1. In the case of a gasoline engine, the torque control element is a throttle valve 1a that opens in degrees to regulate intake air, in amount, admitted to the engine. The torque control is not limited to regulating the intake air, and regulating fuel injection, in amount, also may be employed to control the engine torque. In this case, the torque control element may Include a fuel injection pulse width modulator. The engine 1 outputs its power through the engine output shaft 20. The engine output shaft 20 is connected to an input shaft 22 of the CVT 3. The CVT 3 transfers the engine power to its CVT output shaft 24. The CVT output shaft 24 transfers the engine power to a final drive 4, which moves the vehicle with road wheels 5, A clutch may be positioned between the engine output shaft 20 and the CVT input shaft 22 to engage and disengage the road load to the engine 1. The clutch needs not to be positioned before the CVT. It may be also positioned between the CVT output shaft 24 and the final drive 4. The clutch may be replaced with a hydrodynamic unit such as a torque converter 2a. The torque converter 2a may be positioned between the engine output shaft 20 and the CVT input shaft 22. The CVT input shaft 22 may be connected to a forward-reverse (F-R) changeover mechanism 2b to change direction of rotation of the road wheels 5. The F-R changeover mechanism 2b needs not to be positioned before the CVT 3. It may also be positioned between the CVT output shaft 24 and the final drive 4. All of the above components of the engine-CVT drive train transfer the load of the vehicle back to the engine 1.

The vehicle operator perceives the state of the vehicle through normal senses. The operator depresses or releases the accelerator pedal sending a power request command to an engine-CVT controller 8 through an accelerator sensor 9. The accelerator sensor 9 detects depressed position of the accelerator pedal and generates an accelerator (ACC) signal indicative of the detected depressed position. The operator sends a select signal (e.g. Park, Drive, Neutral, Reverse) to the engine-CVT controller 8. The controller 8 controls the F-R changeover mechanism 2b in response to the select signal.

The controller 8 senses the state of the engine 1 and the CVT 3 through a vehicle speed sensor 10 and through an engine speed sensor 12. The controller 8 also senses the state of the drive train or driveline through wheel speed sensors 11. The vehicle speed sensor 10 detects rotational speed of the CVT output shaft 24. Each wheel speed sensor 11 generates a train of pulses, as its output signal, which is indicative of wheel rotational speed of the associated road wheel 5. The engine speed sensor 12 detects rotational speed of the engine output shaft 20, which is also the speed of the CVT input shaft 22. In the case where the torque converter 2a is positioned between the engine output shaft 20 and the CVT input shaft 22, a table look-up conversion may be needed to compensate for any difference between the engine speed and the CVT input shaft speed, which may occur during transients. The engine speed sensor may be replaced with a turbine speed sensor. The turbine speed sensor detects rotational speed of a turbine shaft 26 of the torque converter 2a, which is also the speed of the CVT input shaft 22. In response to the power request command, the engine and CVT states, the controller 8 sends a throttle actuator command through a line 28 and a ratio actuator command through a line 30. The throttle actuator command controls operation of a throttle actuator 1b, which positions the throttle valve 1a through the actuator shaft represented by dotted line 1c. The ratio actuator command controls the ratio of the CVT 3 by controlling a stepping motor, which positions a spool of a servo valve system. The stepping motor and the servo valve system are well known and disclosed in U.S. Pat. No. 5,083,474 issued to Nakano on Jan. 28, 1992, which is hereby incorporated by reference in its entirety. A representative example of controlling the ratio of the CVT is disclosed in U.S. Pat. No. 5,707,313 issued to Suzuki on Jan. 13, 1998, which is hereby incorporated by reference in its entirety.

The controller 8 may include a microcomputer and its peripheral devices and it is designed to perform total management of a vehicle with the drive train illustrated in FIG. 1.

Figure 2:
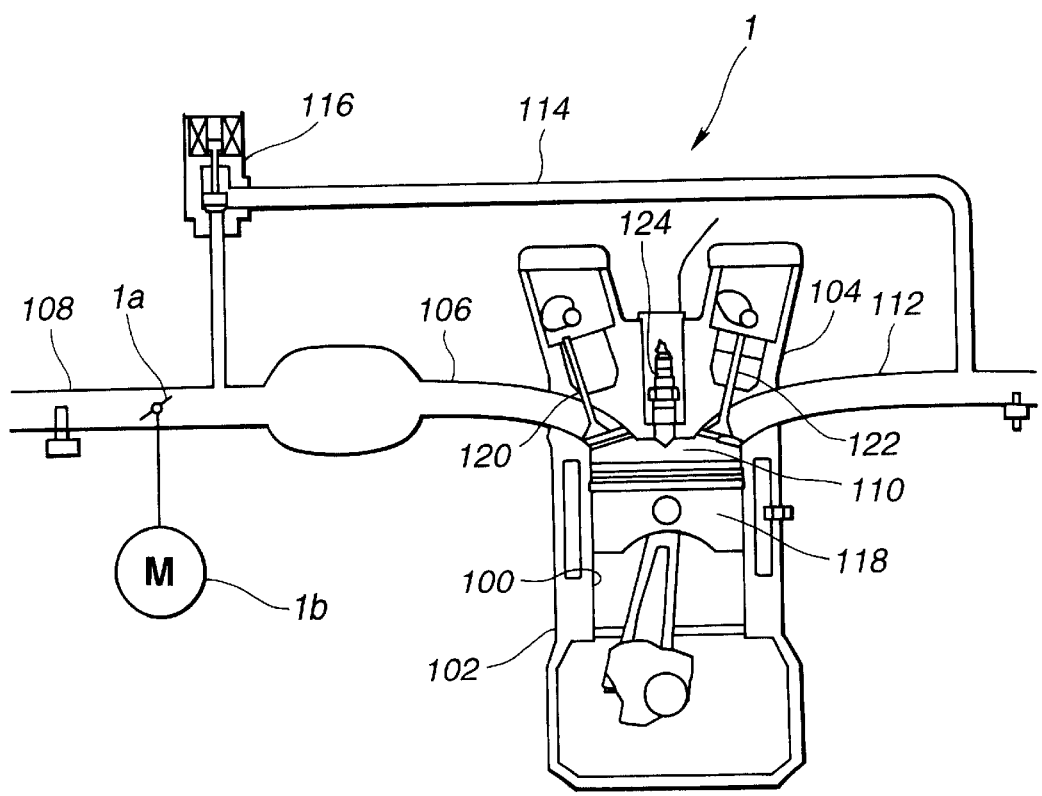
FIG. 2 is a drawing of a fragment of the engine control system.

FIG. 2 illustrates the engine 1 used in this embodiment. The engine 1 is in the form of a gasoline internal combustion engine.

In the usual or conventional manner, the engine 1 has a plurality of cylinders, only one being shown and designated at 100 in FIG. 2, in a cylinder block 102 with a cylinder head 104 thereon. An intake manifold 106 is connected to an intake path 108 in which the throttle flap 1a is mounted. The intake manifold 106 is connected to the cylinder head 104 for admission of intake air to combustion spaces, only one being shown in FIG. 2 and designated at 110, of the cylinders. A fuel injection or admission system, not shown, is admitted to the combustion spaces to form combustible charge therein. An exhaust manifold 112 is connected to the cylinder head 104 for discharge of exhaust gas resulting from combustion within the combustion spaces. An exhaust gas recirculation conduit (EGR) 114 provides a path through which a portion of the exhaust gas passes into the intake manifold 106. A solenoid operable EGR valve 116 forms a part of an EGR passage in the EGR conduit 114 and has different valve openings. The cylinders have pistons, respectively, only one being shown in FIG. 2 and designated at 118. The cylinder head 104 has cylinder valves including intake valves, only one being shown in FIG. 2 and designated at 120, and exhaust valves, only one being shown in FIG. 2 and designated at 122, and ignition plugs, only one being shown in FIG. 2 and designated at 124. Each cylinder performs an intake phase where its piston descends with its intake valve or valves open and a compression phase where its piston ascends. A combustion and power phase is initiated by spark by its ignition plug. The power phase is followed by an exhaust phase where its piston ascends to displace exhaust gas out of the cylinder via the exhaust valve or valves.

Figure 3:
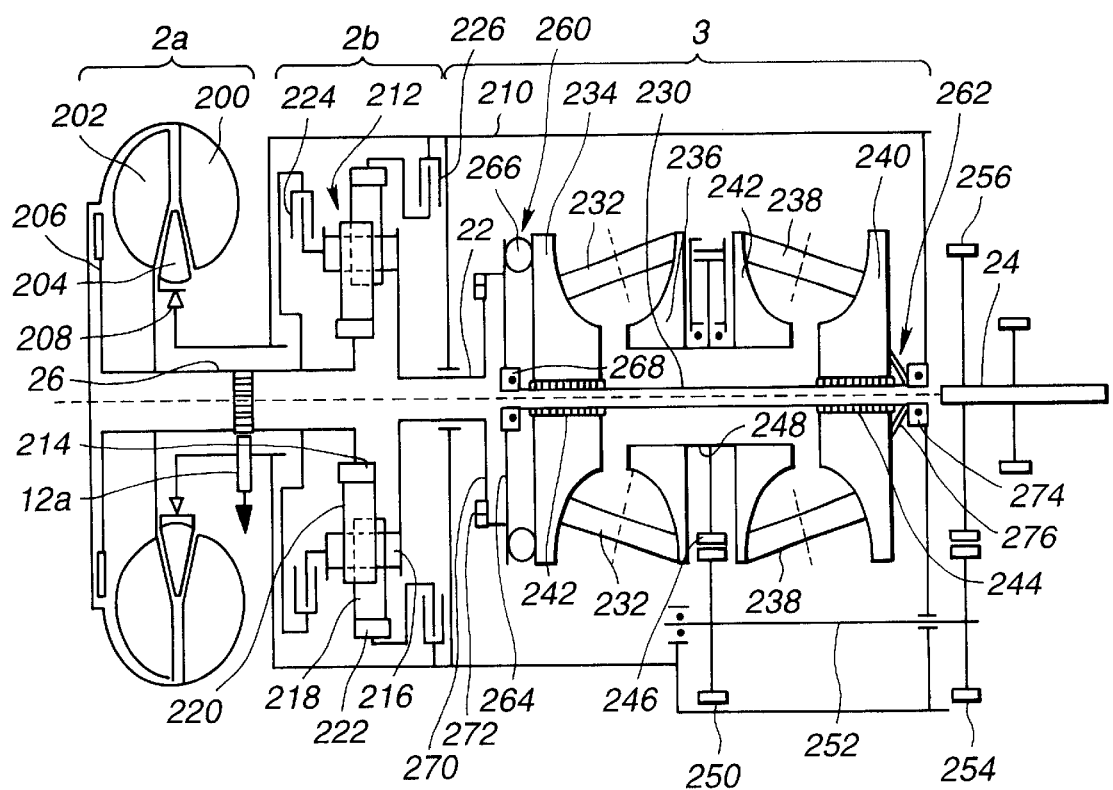
FIG. 3 is a schematic view of the CVT with a forward/reverse changeover mechanism and a torque converter.

The drive train of this embodiment can be understood with reference to FIG. 3.

In the drive train illustrated in FIG. 3, the torque converter 2a is positioned between the engine output shaft 20 and the CVT input shaft 22 and the F-R changeover mechanism 2b is positioned between the torque converter 2a and the CVT input shaft 22.

The torque converter 2a includes a pump impeller 200 connected to the engine output shaft 20, a turbine runner 202 connected to turbine shaft 26, and a stator 204 situated between the pump impeller 200 and the turbine runner 202. A lockup or bridge clutch 206 is positioned to engage and disengage the turbine runner 202 to the pump impeller 200. One-way clutch 208 is positioned to anchor the stator 204 to a transmission casing 210 to prevent the stator 204 from rotating in one direction. The speed sensor 12a is arranged around the turbine shaft 26 to detect rotational speed of the turbine shaft 26.

The F-R changeover mechanism 2b includes a planetary gear set (PGS). A sun gear 214 of the PGS is connected to the turbine shaft 26. A pinion carrier 216 of the PGS is connected to the CVT input shaft 22. The pinion carrier 216 supports a plurality of pairs of intermeshed pinions, namely, an outer pinion 218 and an inner pinion 220. The outer pinions 218 are in meshing engagement with a ring gear 222, while the inner pinions 220 are in meshing engagement with the sun gear 214. A forward clutch 224 is positioned to engage and disengage the pinion carrier 216 to the turbine shaft 26. A reverse brake 226 is positioned to anchor and release the ring gear 222 to the transmission casing 210. The operator places a manual selector valve to "Park" or "Neutral". Then, both the forward clutch 224 and the reverse brake 226 are released to disengage the CVT 3 from the engine. Upon selection of "Drive" from "Neutral", the forward clutch 224 is engaged and the reverse brake 226 left released. Under this condition, the PGS is locked for allowing unitary rotation of the CVT input shaft 22 with the turbine shaft 26. Upon selection of "Reverse" from "Neutral", the reverse brake 226 is engaged or applied with the forward clutch 224 left released. Under this condition, as the ring gear 222 is anchored, forward rotation of the sun gear 214 causes reverse rotation of the pinion carrier 216 and the CVT input shaft 22.

The CVT input shaft 22 is coaxial with a center shaft 230 that is supported by the transmission casing 210. First traction rollers 230 are positioned between and in engagement with a first set of toroidal input and output discs 234 and 236. Second traction rollers 238 are positioned between and in engagement with a second set of toroidal input and output discs 240 and 242. The output discs 236 and 242 of the first and second sets are disposed between the input discs 234 and 240 of the first and second sets. The input discs 234 and 240 are connected to the center shaft 230 through the ball spline connections 242 and 244, respectively, for rotation with the center shaft 230 as a unit. The transmission casing 210 supports via bearings an output gear 246 for rotation relative thereto. The output gear 246 is positioned between the output discs 236 and 242 and has a sleeve extension 248. The output discs 236 and 242 are connected to the sleeve extension 248 by spline connections for rotation with the output gear 246. The output gear 246 meshes with a first gear 250 of an intermediate shaft 252 that is supported by the transmission casing 210. The intermediate shaft extends outwardly of the transmission casing 210. A second gear 254 of the intermediate shaft 252 is positioned outside the transmission casing 210 and meshes with a gear 256 of the CVT output shaft 24. In this embodiment, the turbine speed sensor 12A is arranged to detect rotational speed of the turbine shaft 26.

A first loading arrangement 260 is positioned to bias the input disc 234 of the first set toward the output disc 236 thereof. A second loading arrangement 262 is positioned to bias the input disc 240 of the second set toward the output disc 242 thereof. The first loading arrangement 260 includes a cam flange 264 and a cam roller 266. The cam flange 264 is supported by the center shaft 230 by a bearing 268 and connected to a radial extension of the CVT input shaft 22 by spline connection for rotation therewith as a unit. The cam roller 266 is positioned between and in engagement with opposing cam surfaces of the cam flange 264 and the adjacent input disc 234. The second loading arrangement 262 includes a thrust ball bearing 274 and a Belleville spring 276. The Belleville spring 276 is positioned between and in engagement with the input disc 240 of the second set and the thrust ball bearing 274. For further understanding of these loading arrangements, reference is made to U.S. Pat. No. 5,027,669 issued to Nakano on Jul. 2, 1991, which has been hereby incorporated by reference in its entirety.

Tiling the rollers 232 and 238 alters a ratio between rotational speed of the input discs 234 and 240 and rotational speed of the output discs 236 and 242. The force to tilt the rollers is generated due to "steering" effect that is produced by offsetting the axes of rotation of the rollers from the axis of rotation of the discs. This effect is analogous to the change in vehicle's orientation when the vehicle steering wheel is turned. The axes of rotation of the rollers are offset by the servo valve system and the stepping motor, which are disclosed in U.S. Pat. No. 5,083,473, in response to the ratio actuator command signal.

Haruyoshi KUMURA et al. reported on the passenger car performance using the engine-CVT drive train in "Performance of a Dual-Cavity Half-Toroidal CVT for Passenger Cars" pp 135–140 of International Conference on Continuously Variable Power Transmissions held Sep. 11–12, 1996. This paper is hereby incorporated by reference for facilitating understanding of the illustrated engine-CVT drive train.

Figure 4:
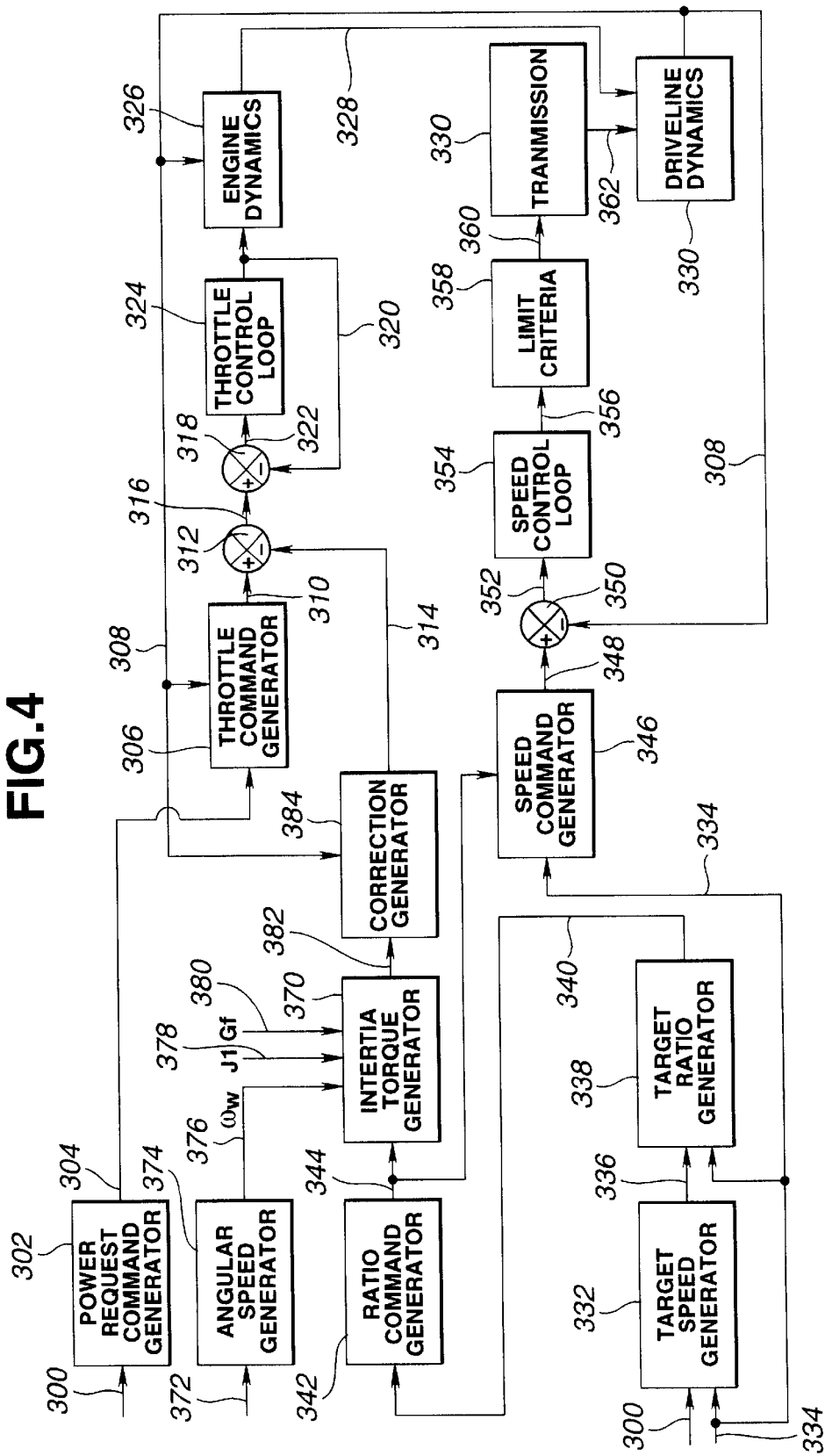
FIG. 4 is a control diagram showing control performed in the controller.

A preferred implementation of the present invention can be understood with reference to the control diagram of FIG. 4. The operator signal from the accelerator pedal on line 300 is used as the input to a power request command generator 302. The power request command generator 302 may be as simple as a look-up table in the controller memory. The power request command generator 302 outputs a power command signal on line 304. The power command signal on line 304 is input into a throttle command generator 306. A measure of actual engine speed on line 308 is also input into the throttle command generator 306. The throttle command generator 306 generates, as a function of power command and actual engine speed, a throttle position command on line 310. The throttle command generator 306 may be a two-dimensional look-up table in the controller memory. The throttle position command on line 310 is input into a summation block 312, which corrects the throttle position command with a throttle angle correction on line 314. The summation block 312 outputs a corrected throttle position command on line 316. The corrected throttle position command on line 316 is input into comparison block 318, which compares the actual throttle position on line 320 with the corrected throttle position command on line 316 and outputs a throttle error signal on line 322.

The throttle error signal is input into throttle control loop 324, which controls the position of the throttle 1a. The throttle control loop 324 may consist of a PID controller, but not limited to such a controller. The actual throttle position represented by line 320 controls the torque output of the engine, represented by block 326. The output power of the engine 326, represented by line 328, affects the vehicle driveline dynamics, represented by block 330.

Figure 6:
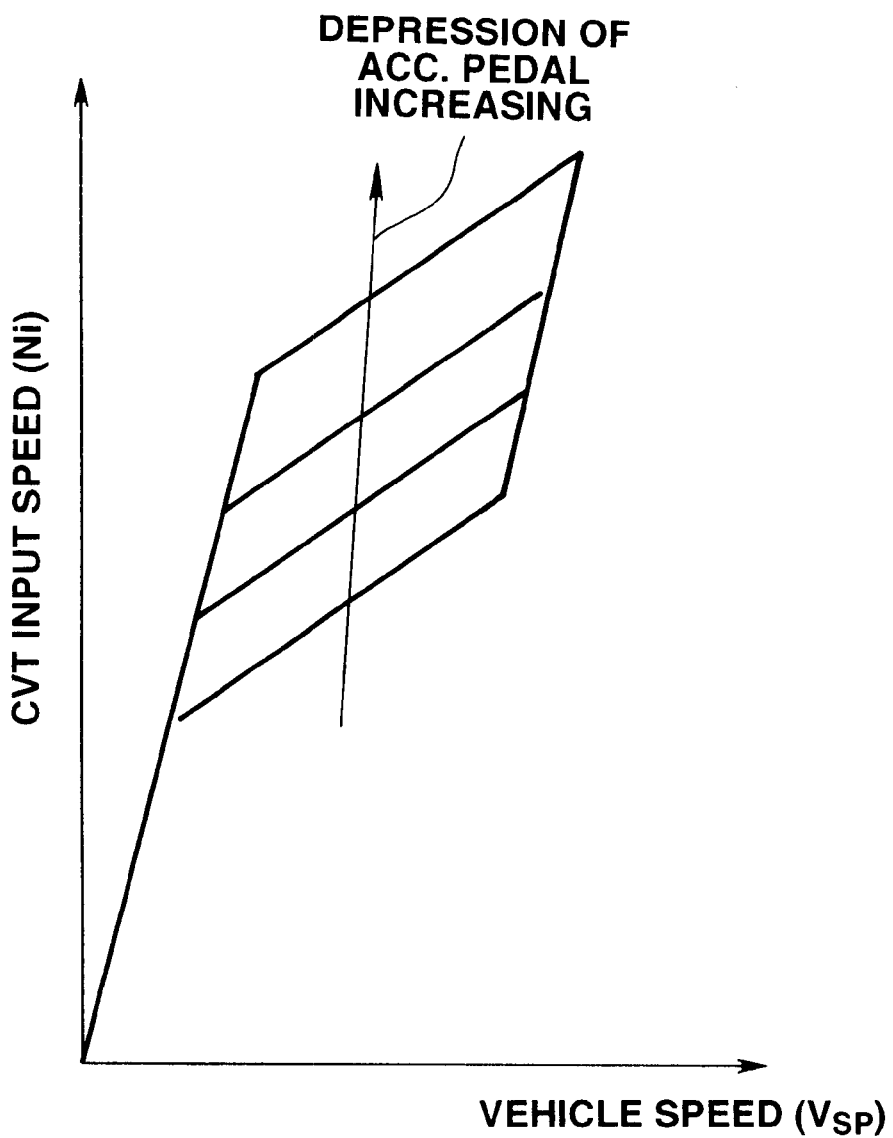
FIG. 6 is a CVT map illustrating variations a CVT input shaft speed versus variations of the vehicle speed against variations of accelerator pedal position or angle.

The operator signal from the accelerator pedal on line 300 is also input into target speed generator 332. A measure of actual vehicle speed (VSP) on line 334 is also input into target speed generator 332. The target speed generator 332 generates, as a function of the operator signal from the accelerator sensor 9 and actual vehicle speed (VSP), a target CVT input speed signal (Ni) on line 336. The target speed generator 332 may be a two-dimensional look-up table in the controller memory. FIG. 6 illustrates one example of the relation between data in this two-dimensional table. The target CVT input speed (Ni) on line 336 is input into target ratio generator 338. The actual vehicle speed on line 334 is also input into target ratio generator 338. The target ratio generator 338 computes a target ratio (Gt) as a function of the CVT input speed and the actual vehicle speed and outputs target ratio signal (Gt) line 340. The function can be expressed as, $$Gt = k1 \cdot Ni/Vsp \qquad \text{Eq. 2}$$

where:
k1 is a constant that is used to convert the ratio Ni/Vsp to a rotational speed ratio of input discs 234, 240 and output discs 236, 242.

The target ratio (Gt) on line 340 is input into ratio command generator 342. The ratio command generator 342 outputs ratio command (Gi) on line 344. Various manners of determining ratio command (Gi) out of target ratio (Gt) will be later described.

The ratio command on line 344 is input into speed command generator 346. The actual vehicle speed on line 334 is also input into speed command generator 346, which outputs a speed command signal on line 348. The speed command generator 346 may be a two-dimensional look-up table in controller memory. The speed command on line 348 is input into comparator block 350, which compares the speed command with actual engine speed on line 308 and outputs a speed error signal on line 352. The speed error signal on line 352 is input into speed control loop 354. The speed control loop 354 may be a simple PID controller but is not so limited. The speed control loop 354 outputs stepping motor position command, as the ratio actuator command, on line 356. The stepping motor position command is limited by a limit function in bock 358. The stepping motor position command is then output on line 360 and controls ratio in the CVT. Line 362, leading into block, illustrates that ratio rate in the CVT affects the driveline dynamics of the vehicle controlling the actual engine speed represented by line 308.

The ratio command (Gi) on line 344 is also input into inertia torque generator 370. The sensor output of the wheel speed sensor 11 on line 372 is used as the input to an angular speed generator 374. The angular speed generator 374 may be a counter in the controller 8. The angular speed generator 374 outputs a wheel angular speed ($\omega_w$) on line 376. The wheel angular speed ($\omega_w$) on line 376 is input into the inertia torque generator 370. Moment of inertia (J1) on line 378 is used as input to the inertia torque generator 370. The moment of inertia (J1) to which the CVT input shaft 22 is subjected to when the changeover mechanism 2b is conditioned for the forward drive. This moment is determined as a function of masses of rotational parts of the engine 1 and those of rotational parts between the engine output shaft and the CVT input shaft 22. In the embodiment, the moment of inertia (J1) is a predetermined constant. A final drive reduction ratio (Gf) on line 380 is used as input to the inertia torque generator 370. The final drive ratio (Gf) is a predetermined constant. The inertia torque generator 370 generates, as a function of ratio command (Gi), wheel angular speed ($\omega_w$), moment of inertia (J1) and final drive reduction ratio (Gf), inertia torque ($\Delta$Te_inertia) on line 382. The inertia torque ($\Delta$Te_inertia) on line 382 is input into a correction generator 384. The measure of actual engine speed on line 308 is also input into the correction generator 384. The correction generator 384 may be as simple as a look-up table in the controller memory. The correction generator 384 generates a throttle angle correction, which is required to get engine torque change against the inertia torque (ΔTe_inertia), on line 314. The throttle angle correction on line 314 is input into the summation block 312.

Turning back to the ratio command generator 342, target ratio (Gt) on line 340 is used as the input and ratio command (Gi) is generated on the line 344. Ratio command (Gi) on line 334 controls ratio rate with respect to time during transient to the target ratio (Gt).

The ratio command generator 342 computes ratio command (Gi), which can be expressed as, $$Gi=\{1/(1+T \cdot s)\} \cdot Gt \qquad \text{Eq. 3,}$$

where:

T is the first order delay transfer function, and s is Laplacian.

According to this equation, simple transfer function T is used to determine ratio command Gi.

The second manner of determining ratio command Gi is to compute the following equation, $$Gi=Gi(k-1)+\text{sign}\{Gtk-Gi(k-1)\} \cdot \min\{\Delta G, |Gtk-Gi(k-1)|\} \qquad \text{Eq. 4,}$$

where:

Gi(k−1) is ratio command computed last time,

Gtk is target ratio computed this time,

ΔG is a difference between actual ratio measured this time and that measured last time.

In the equation Eq. 4, "sign" represents a plus or a minus sign of the result of computation within bracket { } that follows, and "min" represents selection of a smaller one of ΔG, and |Gtk−Gi(k−1)|. This equation gives ratio command Gi that changes in ramp manner.

The third manner of determining ratio command is to compute the following equation, $$Gi=\{R1(s)/R2(s)\} \cdot Gt \qquad \text{Eq. 5,}$$

where:

R1(s) is a mathematical expression of a canonical model that represents a desired change in ratio until target ratio Gt is accomplished, and R2(s) is a mathematical expression of an estimated model of a transfer function of the CVT.

The fourth manner of determining ratio command Gi is to use a filter that represents a canonical model characteristic M(s). This filter is a digital filter that is given after converting a canonical model characteristic Gm(s) expressed in continuous-time system into that expressed in discrete-time system.

Let the canonical model characteristic M(s) be expressed as $$M(s)=1/(1+T1 \cdot s) \qquad \text{Eq. 6,}$$

where:

Ti is the first order delay constant. Then, ratio command Gi can be expressed as follows:

$$Gi=A \cdot Gt(k-1)+B \cdot Gi(k-1) \qquad \text{Eq. 7,}$$

In the equation Eq. 7, B=exp(−Tsamp/T1) and A=1−B. Tsamp is a sampling cycle.

The ratio command generator 342 generates ratio command Gi on line 344. Ratio command Gi on line 344 is used as the input to speed ratio command generator 346 and also to inertia torque generator 370.

The inertia toque generator 370 computes time differential of ratio (dG/dt), which can be expressed as, $$(dG/dt)=\{Gik-Gi(k-1)\}/\Delta t \qquad \text{Eq. 8,}$$

where:

At is sampling time.

Then, the inertia torque generator 370 substitutes the result given by the equation Eq. 8 for (dG/dt) of equation Eq. 1 in computing inertia torque ΔTe_inertia.

The second manner of computing time differential of ratio (dG/dt) is to process target ratio (Gt) on line 340 with a filter of pseudo differential N(s)=s×M(s) that uses the canonical model characteristic M(s). This filter is a digital filter that is given after converting the pseudo differential N(s) expressed in continuous-time system into that expressed in discrete-time system. Let N(s) be expressed as, $$N(s)=s/(1+T1 \cdot s) \qquad \text{Eq. 9.}$$

Then, (dG/dt) can be expressed as follows:

$$(dG/dt)=C \cdot Gt(k)+D \cdot Gt(k-1)+E \cdot (dG/dt)(k-1) \qquad \text{Eq. 10,}$$

where:

C={1−exp (−Tsamp/T1)}/Tsamp,

D={exp(−Tsamp/T1)−1}/Tsamp, and

E=exp(−Tsamp/T1).

The third manner of computing time differential of ratio (dG/dt) is to compute time differential (dGt/dt) of the target ratio on line 340.

Figure 7:
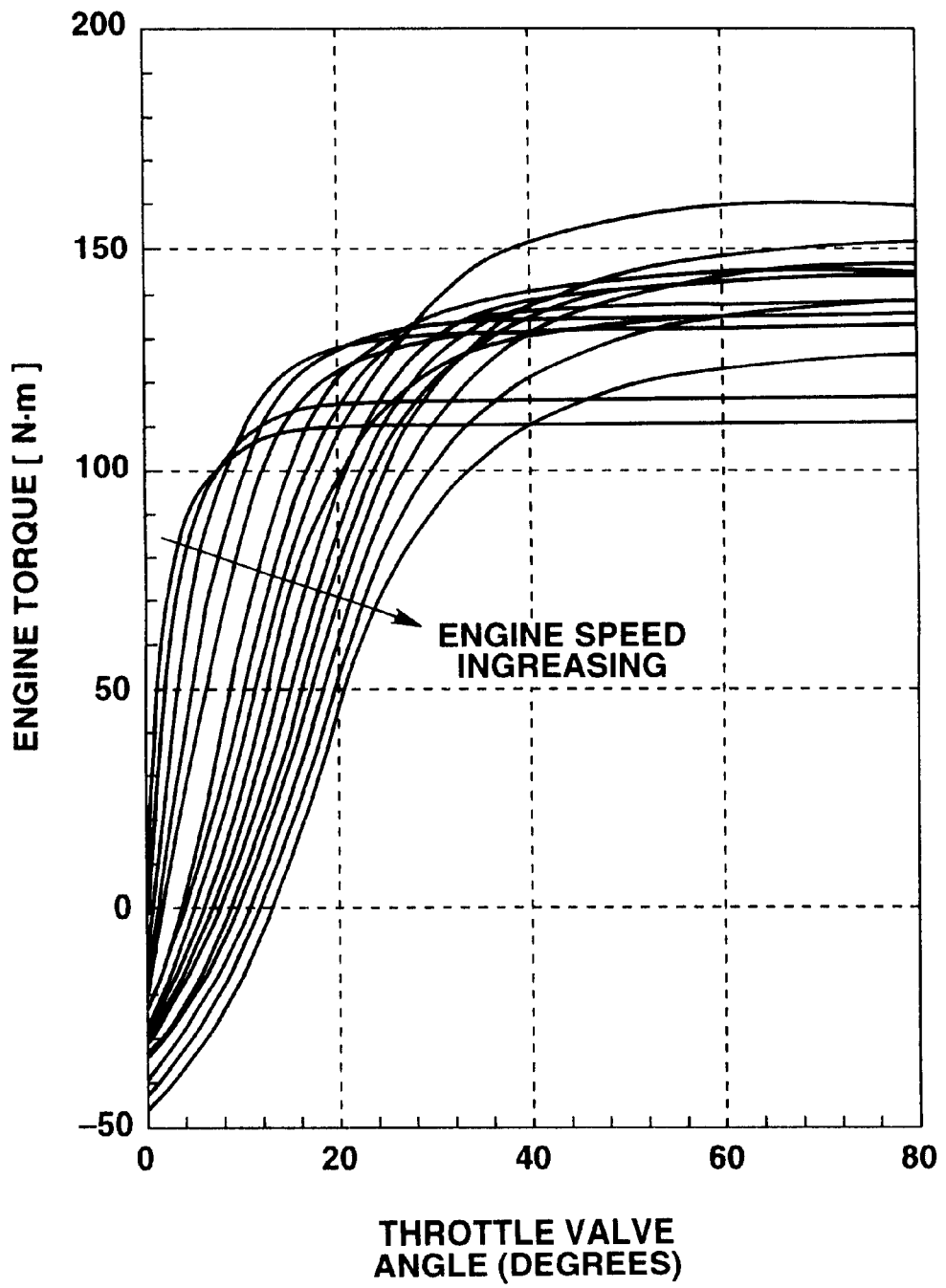
FIG. 7 is an engine map illustrating variations of engine torque versus variations of throttle valve angle against variations of engine speed.
Figure 8:
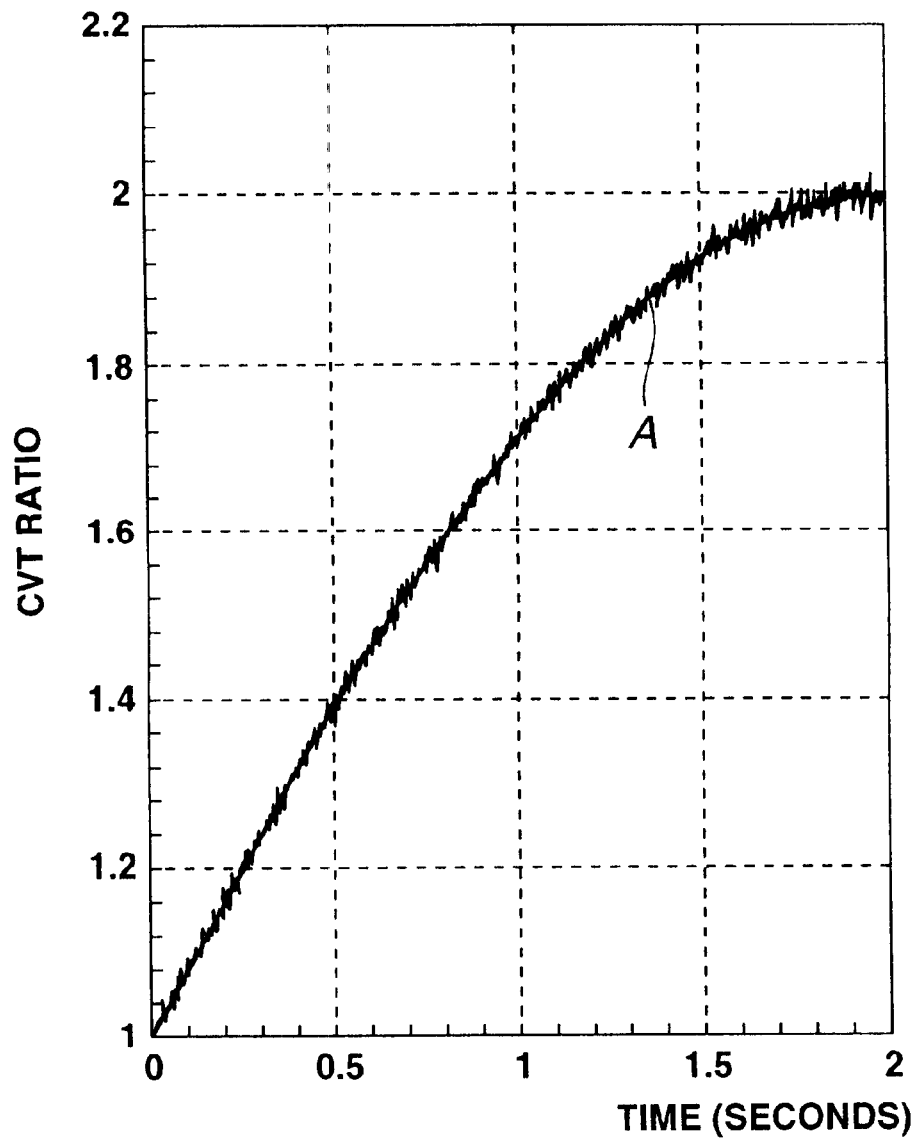
FIG. 8 shows plotting A of simulated measures resulting from superimposing random noise upon real variations of CVT ratio from 1 to 2 against time over period of 2 seconds.
Figure 9A:
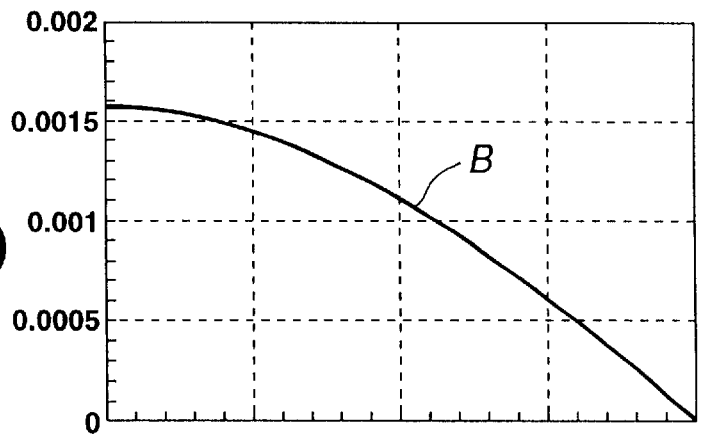
FIG. 9(A) shows a curve B that connects values resulting from repeating subtraction of a previously sampled old value of the real variations of CVT ratio from a currently sampled new value thereof over 0 to 2 seconds.
Figure 9B:
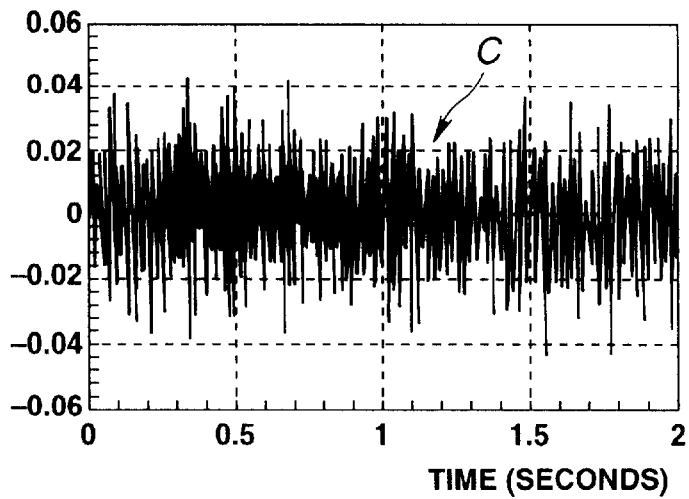
FIG. 9(B) shows plotting C of values resulting from repeating subtraction of a previously sampled old value of the measures in FIG. 8 from a currently sampled new value thereof over 0 to 2 seconds.
Figure 10:
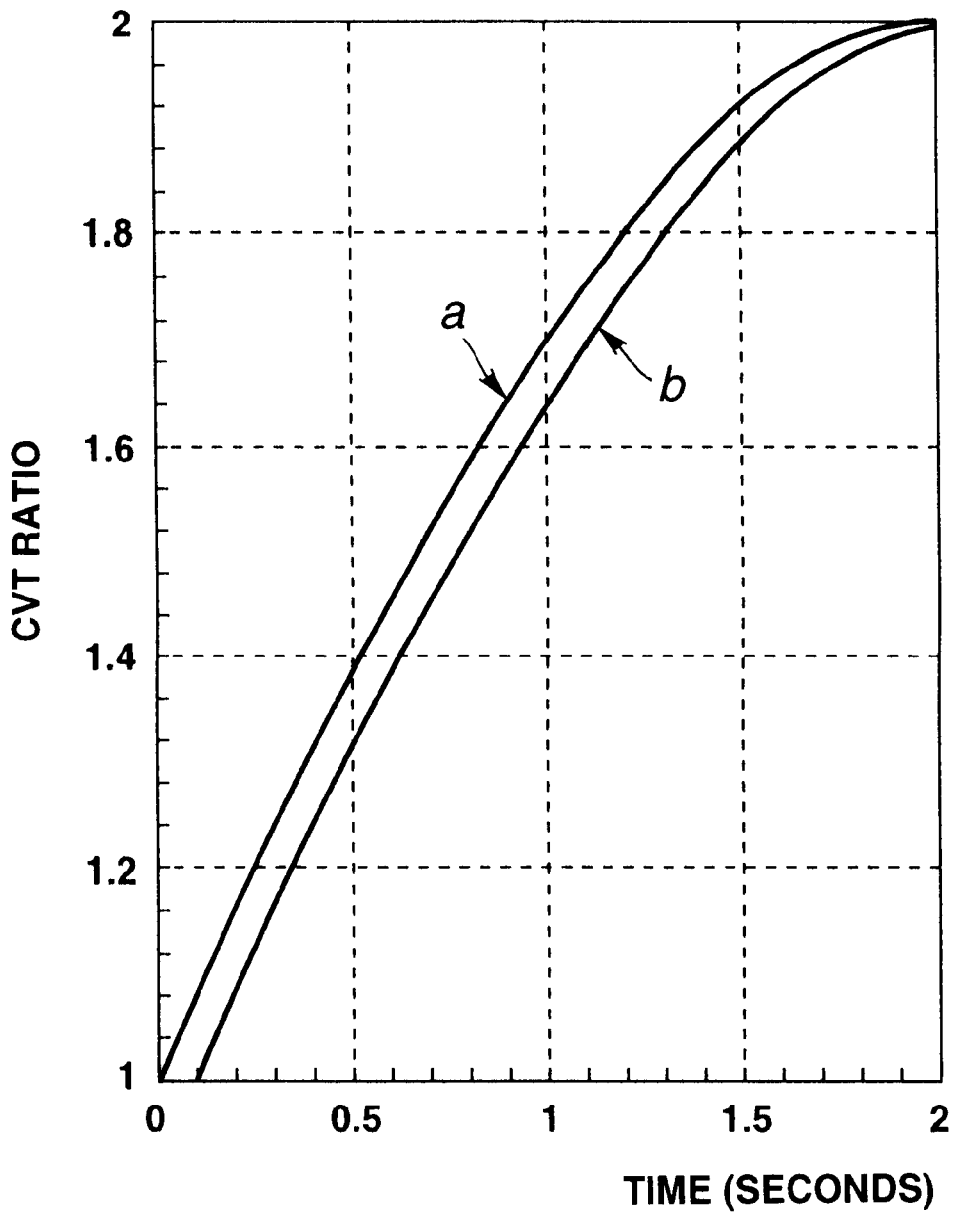
FIG. 10 shows a curve a representing real variations of the CVT ratio from 1 to 2 over a period of 2 seconds, and a curve b representing values resulting from filtering the real variations.
Figure 11:
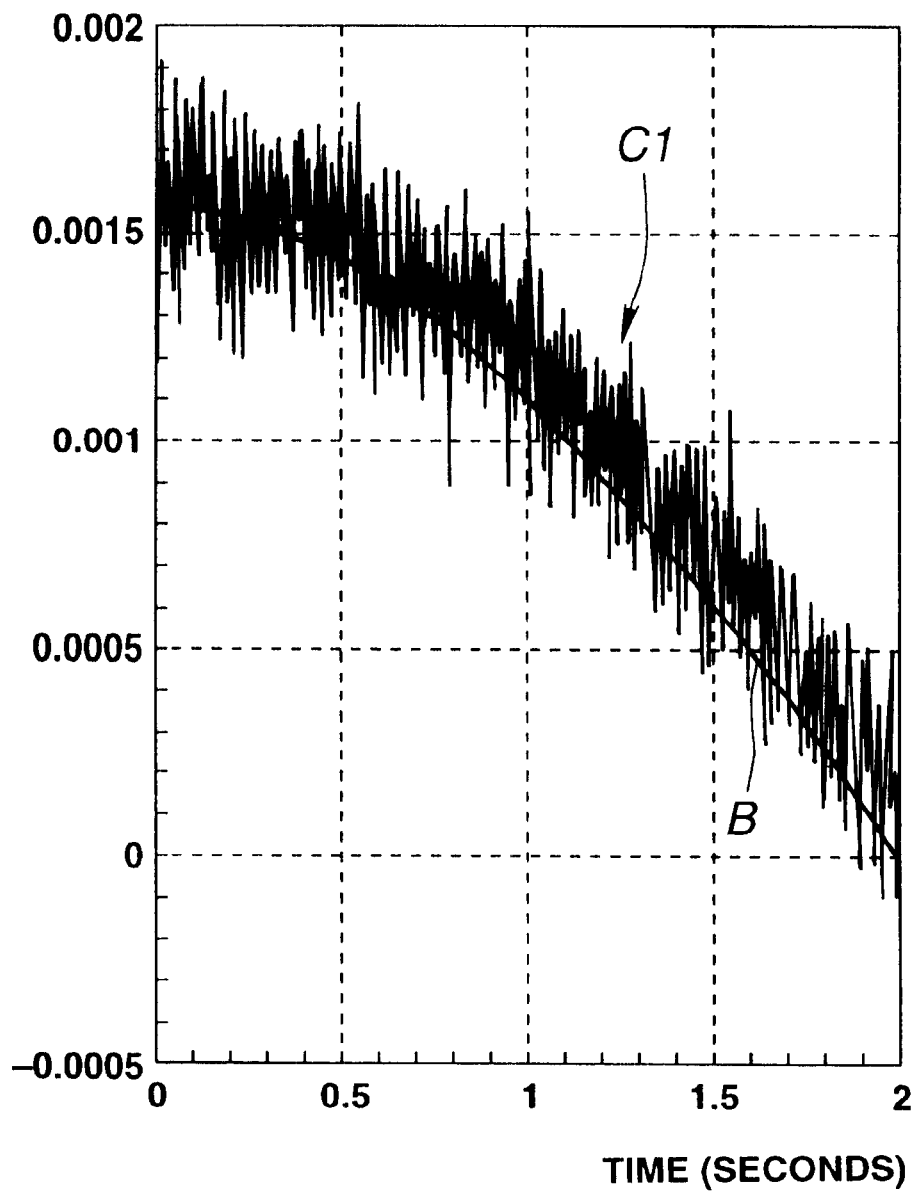
FIG. 11 shows plotting C1 of values resulting from repeating subtraction of a previously sampled old value of the filtered measures from a currently sampled new value thereof over 2 seconds together with the curve B shown in FIG. 9(A).
Figure 12:
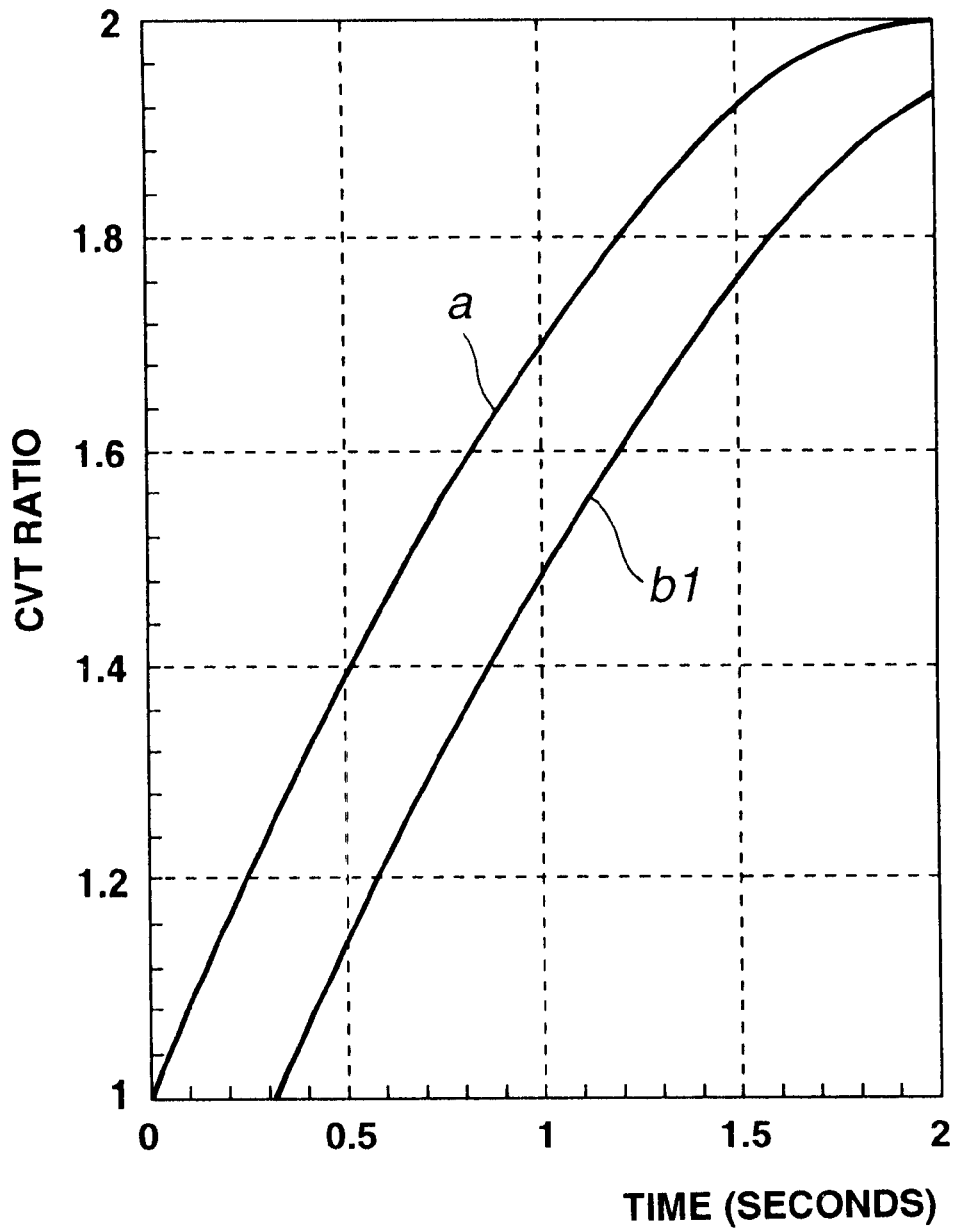
FIG. 12 shows a curve a representing real variations of the CVT ratio from 1 to 2 over a period of 2 seconds, and a curve b1 representing values resulting from filtering the real variations.
Figure 13:
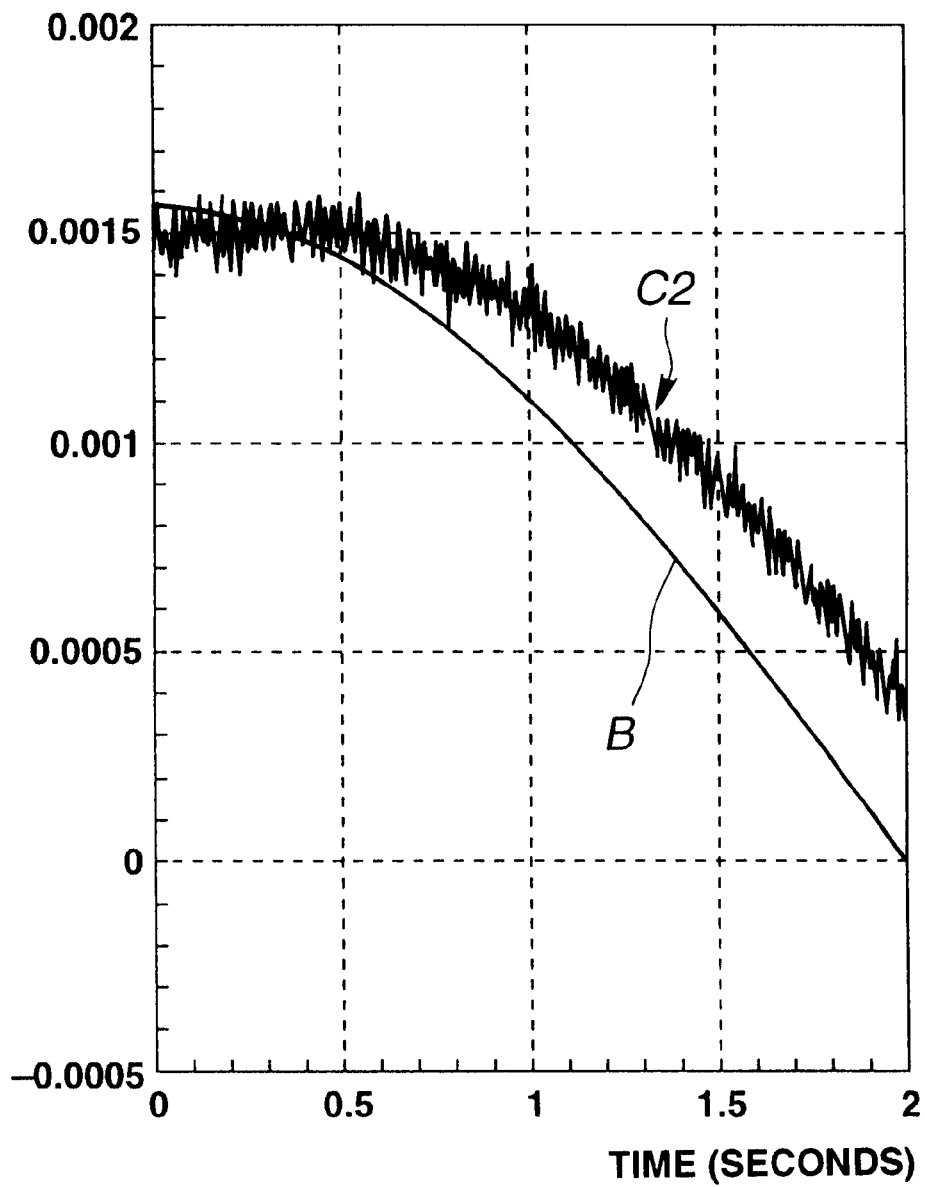
FIG. 13 shows plotting C2 of values resulting from repeating subtraction of a previously sampled old value of the filtered measures from a currently sampled new value thereof over 2 seconds together with the curve B shown in FIG. 9(A).

The inertia torque generator 370 generates inertia torque ΔTe_inertia on line 382. The inertia torque ΔTe_inertia on line 382 is used as the input to correction generator 384. Actual engine speed on line 308 is also used as the input to the correction generator 384. The correction generator 384 may be a look-up table that is extracted from engine torque vs., throttle valve angle curves as shown in FIG. 7 and stored in controller memory. The correction generator 384 generates throttle angle correction, which is required to get engine torque change against the inertia torque ΔTe_inertia, on line 314. The throttle angle correction on line 314 is input into the summation block 312.

Figure 5:
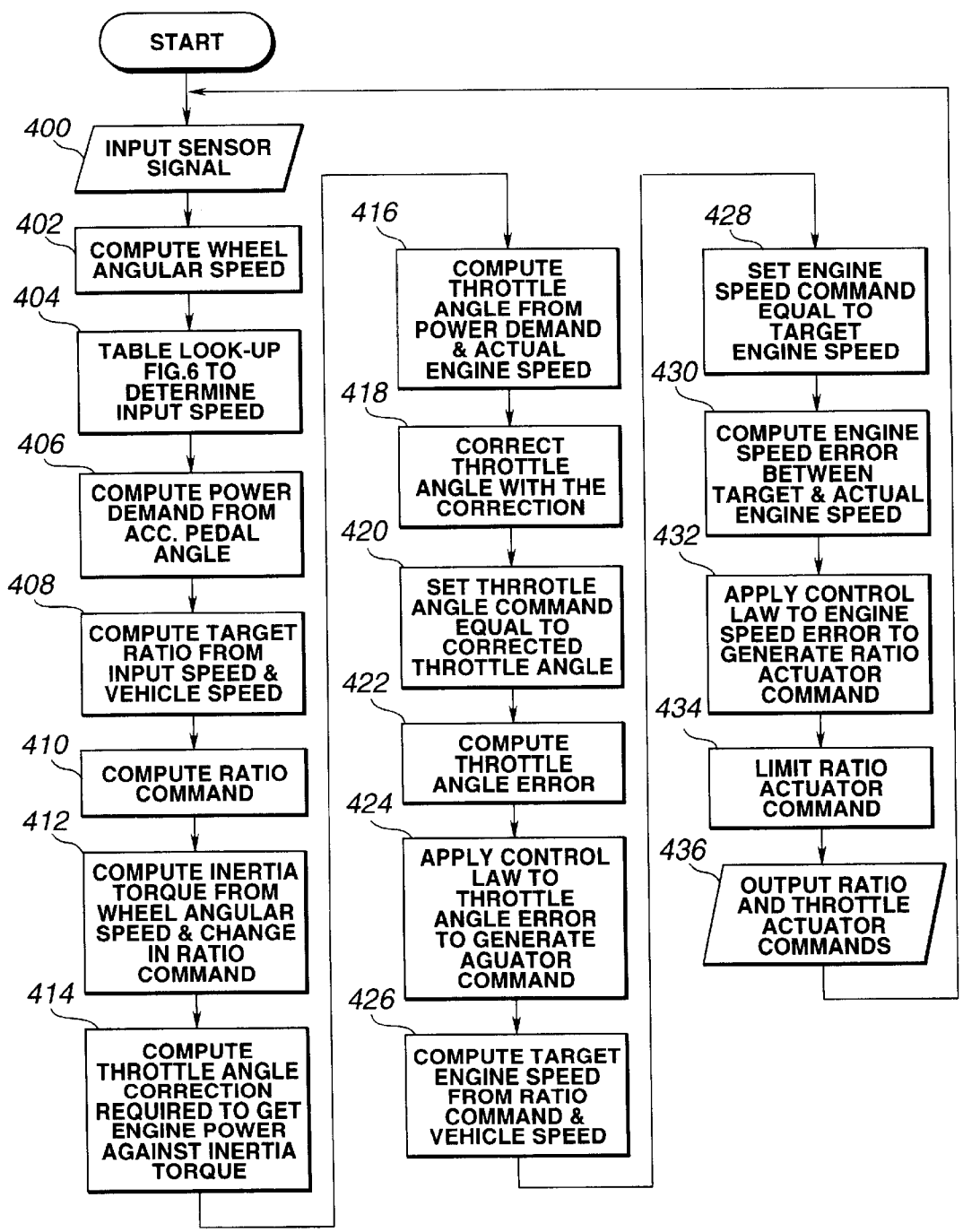
FIG. 5 is a flow chart of a control routine.

The flow chart in FIG. 5 illustrates a control routine of the preferred implementation of the present invention. In input step 400, the controller 8 inputs information of: accelerator pedal angle or position, transmission shift position (Park, Neutral, Drive, Reverse), engine speed, vehicle speed, road wheel speed and throttle position.

In step 402, the controller computes wheel angular speed ($\omega_w$) of road wheels 5. In step 404, the controller performs a table look-up operation of FIG. 6 to determine CVT input speed (Ni). In step 406, the controller computes power demand from the accelerator pedal angle. In step 408, the controller computes target ratio (Gt) from input speed (Ni) and vehicle speed (VSP) using the equation Eq. 2. In step 410, the controller computes ratio command (Gi) from target ratio (Gt) using the equation Eq. 3. In step 412, the controller computes inertia torque (ΔTe_inertia) from ratio command (Gi). In step 414, the controller computes throttle angle correction required to get engine torque change against inertia torque (ΔTe_inertia).

In step 416, the controller computers throttle angle from power demand and actual engine speed. In step 418, the controller corrects the throttle angle with the throttle angle correction. In step 420, throttle angle command is made equal to the corrected throttle angle. In step 422, the controller computes throttle angle error from the actual throttle angle and the throttle angle command. In step 424, the controller uses a control routine to computer a throttle actuator command.

In step 426, the controller computes target engine speed from ratio command (Di) and vehicle speed (VSP). In step 428, engine speed command is made equal to the target engine speed. In step 430, the controller computes engine speed error from the actual engine speed and the engine speed command. In step 432, the controller uses a control routine to compute ratio actuator command. In step 434, the controller imposes a limit to the ratio actuator command. In step 436, the throttle actuator command and ratio actuator command are output.

The above flow chart illustrates just one implementation of the present invention. The present invention is not limited to the use of the control routine described above. The above description illustrates the benefits of the present invention, including improved control over the transient response of the engine-CVT drive train.

In the embodiment illustrated mainly in FIG. 4, a target ratio Gt of the target ratio generator 338 is used as an input to the ratio command generator 342 and a ratio command of the ratio command generator 342 is used as an input to the inertia torque generator 370. The inertia torque generator 370 thus generates an inertia torque ($\Delta Te\_inertia$) on line 382 from or based on a target ratio (Gt) on line 340.

Figure 4A:
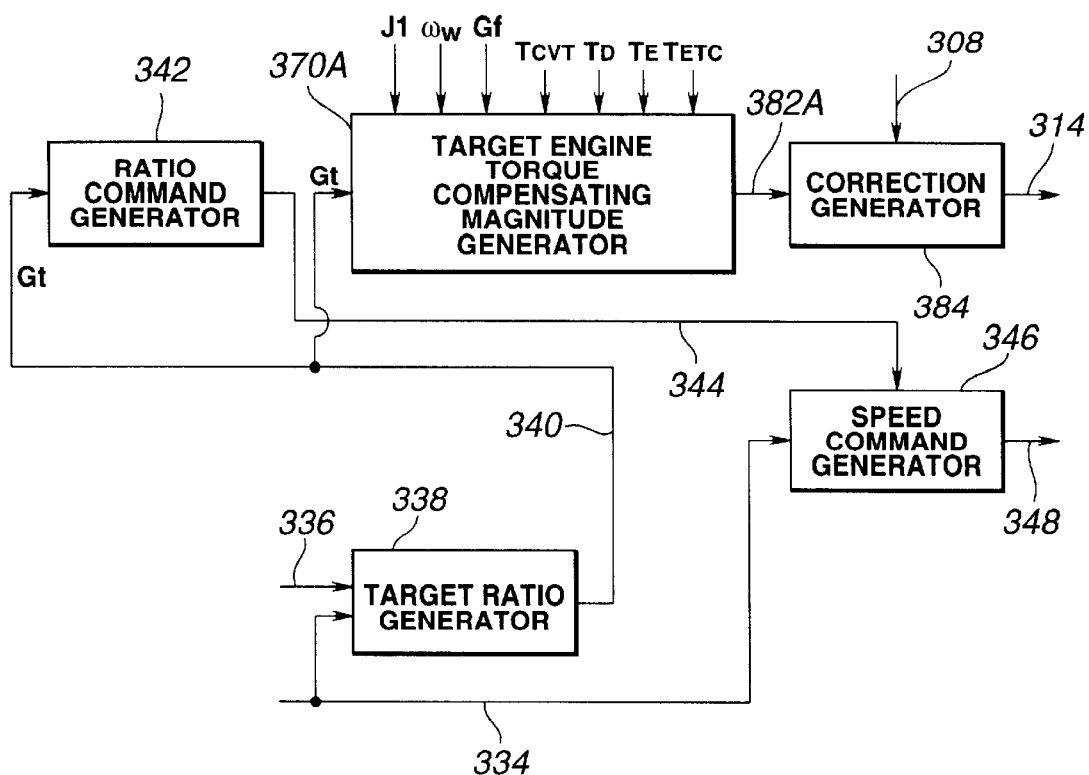
FIG. 4A is a portion of FIG. 4 but incorporating modification implementing another embodiment.
Figure 4B:
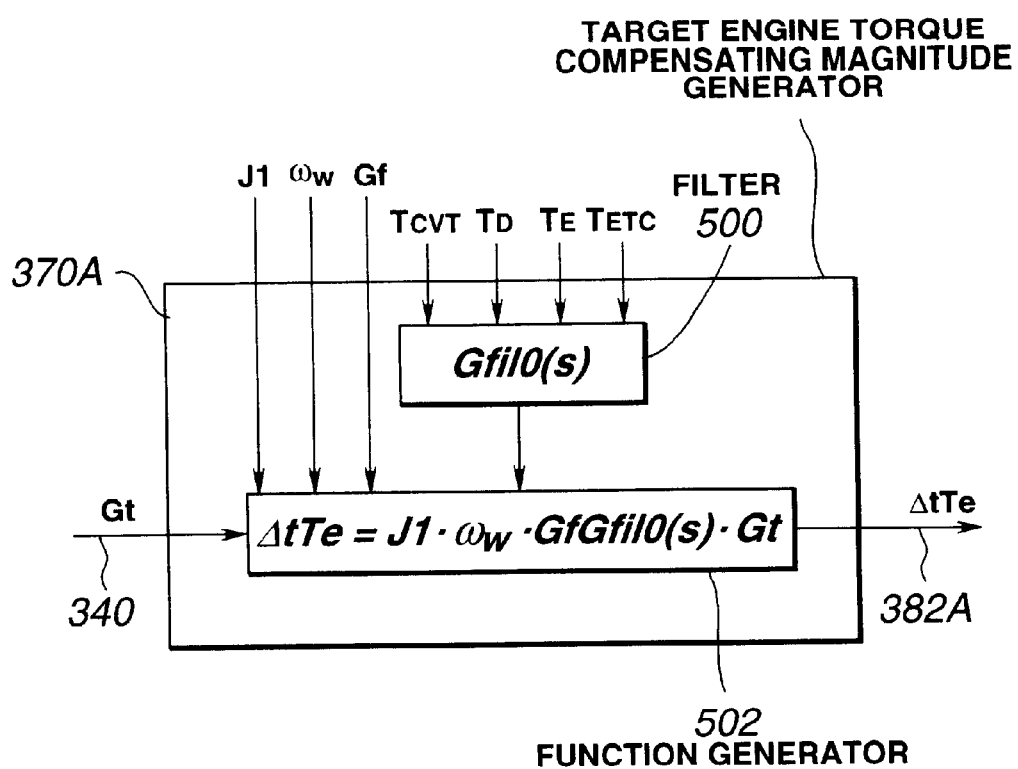
FIG. 4B is a portion of FIG. 4A.

Referring back to FIGS. 4A and 4B, another embodiment is described in which a target ratio Gt of a target ratio generator 338 is used as an input to a target engine torque compensating magnitude generator 370A. This another embodiment is substantially the same as the first embodiment described in connection with FIGS. 1 to 7 except the provision of the modified inertia torque generator 370A and correction generator 384A. FIG. 4A is a portion of FIG. 4 incorporating such modifications. Thus, the same reference numerals are used throughout FIGS. 4 and 4A. FIG. 4B is block diagrams of the target engine torque compensating magnitude generator 370A.

The following discussion focuses on how to cope with time lag between occurrence of inertia torque and occurrence of a change in engine torque that is expected to compensate for the inertia torque.

In this embodiment, it is assumed that transfer characteristic from target ratio Gt to actual ratio G can be expressed as, $$G = P(s) \cdot e^{-T_{CVT} \cdot s} \cdot Gt \quad \text{Eq. 11.}$$

where:
P(s) represents transfer characteristic from target ratio Gt to actual ratio G, and
$T_{CVT}$ is a time constant of delay in CVT.

In this case, inertia torque $\Delta Te\_inertia$ can be expressed as, $$\Delta Te\_inertia = J1 \cdot \omega_w \cdot Gf \cdot s \cdot P(s) \cdot e^{T_{CVT} \cdot s} \cdot Gt \quad \text{Eq. 12}$$

Let us consider the case where inertia torque compensating magnitude $\Delta Te\_control$ is computed from target ratio Gt. The inertia torque compensating magnitude $\Delta Te\_control$ results from delays in the engine and in electronically controlled throttle. Such delays include a time constant $T_E$ of an intake air admission delay, an output torque dead time $T_D$, and a time constant $T_{ETC}$ of a throttle delay. The intake air admission delay is a delay from a change in throttle angle and a resultant change in admission of intake air into engine cylinder. The output torque dead time $T_D$ is a dead time between admission of combustible charge and generation of torque resulting from combustion of the intake charge. The throttle delay is a delay from a command for a target throttle angle to accomplishment of the target throttle angle. Using a phase-adjustment-pseudo-differential filter Gfil0(s), the inertia torque compensating magnitude $\Delta Te\_control$ can be expressed as, $$\Delta Te\_control = J1 \cdot \omega_w \cdot Gf \cdot \{e^{-T_D \cdot s}/(T_E \cdot s + 1)\} \cdot \{1/(T_{ETC} \cdot s + 1)\} \cdot Gfil0(s) \cdot Gt \quad \text{Eq. 13.}$$

The filter Gfil0(s) for phase adjustment between the inertia torque $\Delta Te\_inertia$ and the inertia toque compensating magnitude $\Delta Te\_control$ can be extracted from the equations Eq. 12 and Eq. 13 as, $$Gfil0(s) = s \cdot P(s) \cdot (T_E \cdot s + 1)(T_{ETC} \cdot s + 1) \cdot e^{-(T_{CVT} - T_D) \cdot s} \quad \text{Eq. 14.}$$

Referring to FIG. 4B, the target engine torque compensating magnitude generator 370A includes a filter 500 and a function generator 502. In the filter 500, the Gfil0(s) is computed from the equation Eq. 14 and applied to the function generator 502 along with J1, $\omega_w$ and Gf. Target ratio Gt on line 340 is used as an input to the function generator 502. In the function generator 502, the filter Gfil0(s) is used to compute a target engine compensating magnitude $\Delta tTe$ that can be expressed as, $$\Delta tTe = J1 \cdot \omega_w \cdot Gf \cdot Gfil0(s) \cdot Gt \quad \text{Eq. 15.}$$

The function generator 502 generates the target engine compensating magnitude $\Delta tTe$ on line 382A. The target engine torque compensating magnitude $\Delta tTe$ on line 382A is used as an input to a correction generator 384 (see FIG. 4A). Engine speed Ne on line 308 is used as an input to the correction generator 384. In the correction generator 384, a table look-up operation is performed based on combination of Ne and $\Delta tTe$ to find a throttle angle correction required to get the target engine torque compensating magnitude $\Delta tTe$.

In computing the filter Gfil0(s), it must be taken into account that transfer characteristics of engine, throttle and CVT are subject to variations depending upon operating conditions of the engine-CVT drive train. Let us consider the case where the variations are not negligible in phase adjustment between the inertia torque $\Delta Te\_inertia$ and the inertia torque compensating magnitude $\Delta Te\_control$ over the entire operating conditions. In this case, varying values of parameters, such as $T_E$, $T_{ETC}$ and $T_D$, in each of the equations Eq. 12, Eq. 13, Eq. 14 and Eq. 15 are plotted in controller memory as table data or map data against varying engine speed Ne, intake air quantity measures TP representing engine load, vehicle speed VSP, ratio G, line pressure PL of the transmission and oil temperature To. In computing the filter Gfil0(s), the values of such parameters are varied depending upon operating conditions.

Figure 14:
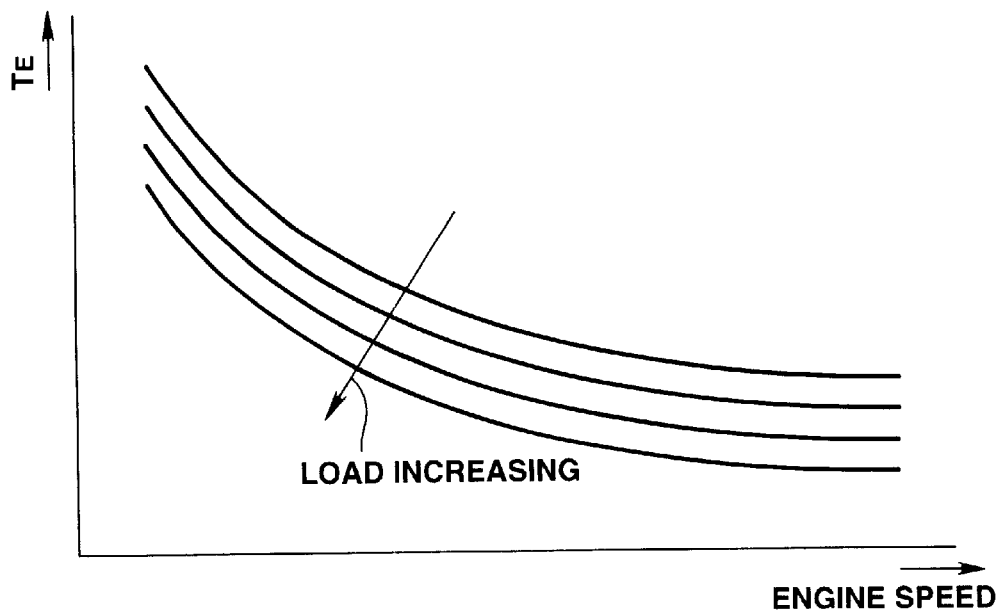
FIG. 14 is a diagram illustrating variations of a time constant $T_E$ of intake air admission delay against engine speed (Ne) and engine load.
Figure 15:
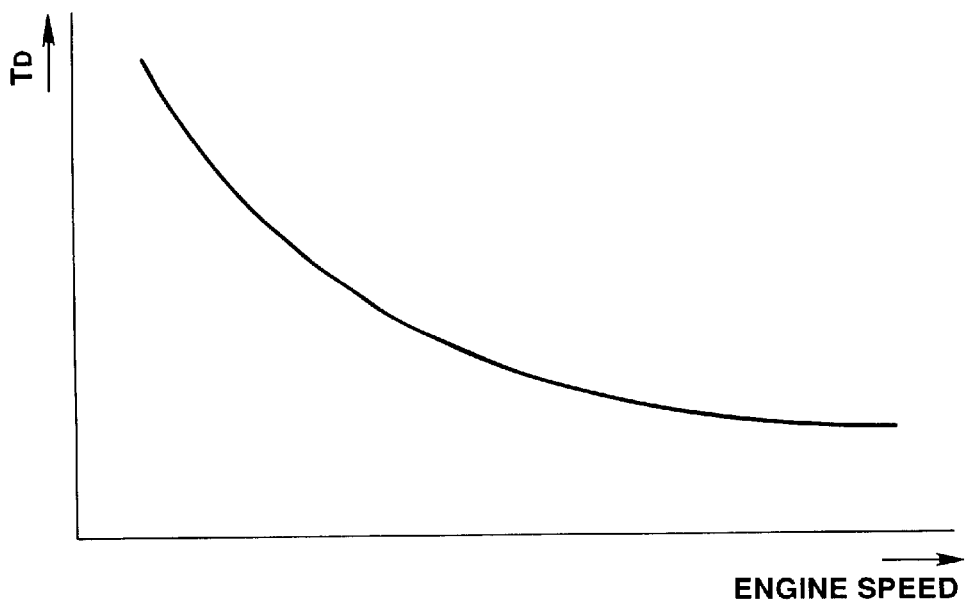
FIG. 15 is a diagram illustrating of a dead time $T_D$ of engine torque against engine speed (Ne).

FIG. 14 illustrates variations of the time constant $T_E$ of intake air admission delay against engine speed Ne and engine load TP. FIG. 15 illustrates variation of the time constant $T_D$ of dead time against engine speed Ne. It is found that the time constant $T_{ETC}$ is unaltered over the entire operating conditions. The transfer characteristic of CVT as represented by P(s) can be expressed as, $$P(s) = G_{CVT}(s) \cdot G_{LOGIC} \quad \text{Eq. 16}$$

where:
$G_{CVT}(s)$ is dynamics of CVT, and
$G_{LOGIC}$ is a time constant of delay of ratio change control logic.

The CVT dynamics $G_{CVT}(s)$ can be expressed as, $$G_{CVT}(s)=(g \cdot f)/(s^2+g \cdot b \cdot s+g \cdot f \cdot a) \qquad \text{Eq. 17.}$$

where:
    a, b, g and f are parameters.

Figure 16:
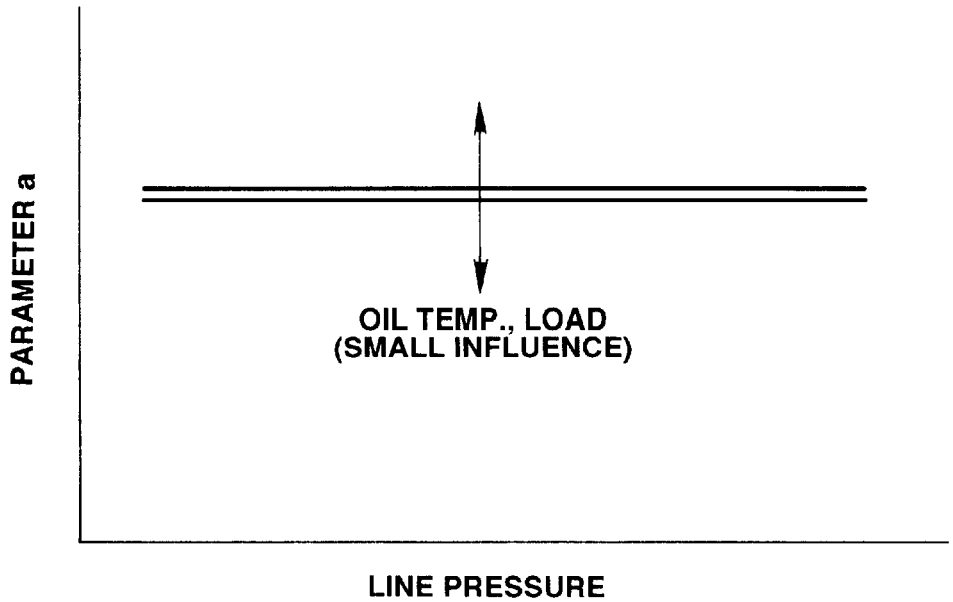
FIG. 16 is a diagram illustrating variations of a parameter a against line pressure of the transmission, oil temperature and load.
Figure 17:
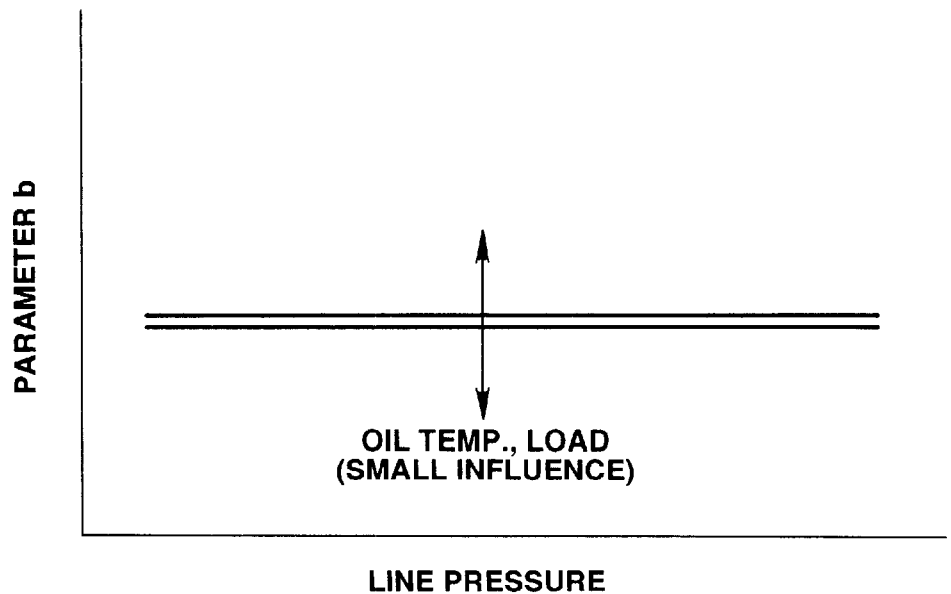
FIG. 17 is a diagram illustrating variations of a parameter b against line pressure of the transmission, oil temperature and load.
Figure 18:
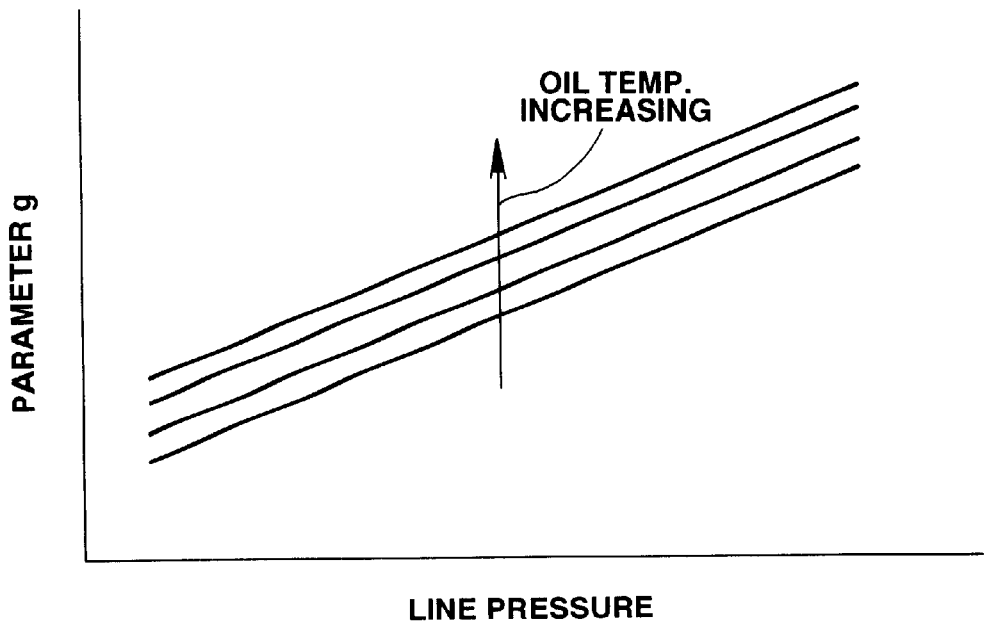
FIG. 18 is a diagram illustrating variations of a parameter g against line pressure of the transmission and oil temperature thereof.
Figure 19:
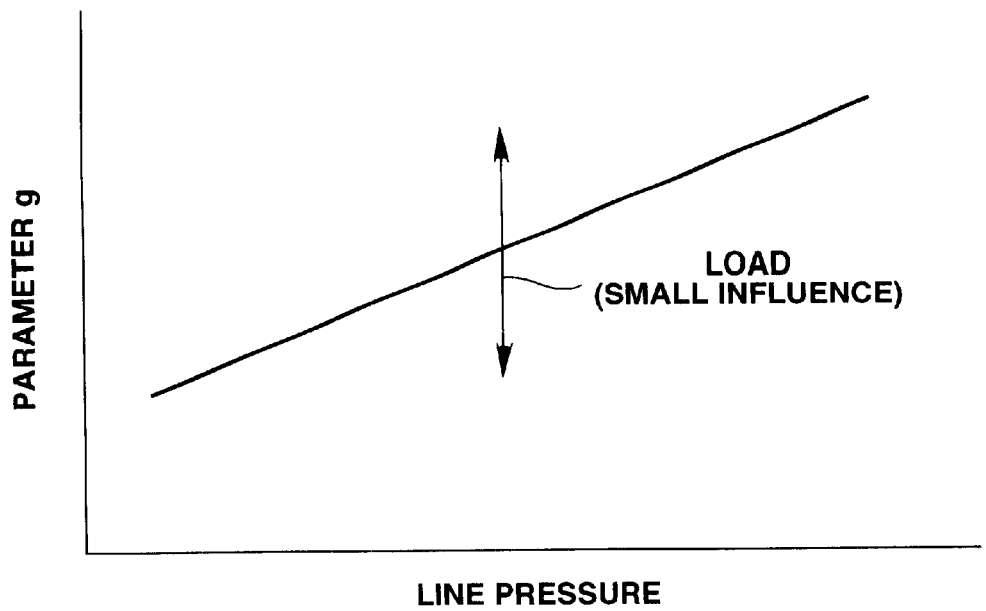
FIG. 19 is a diagram illustrating variations of the parameter g against line pressure of the transmission and load.
Figure 20:
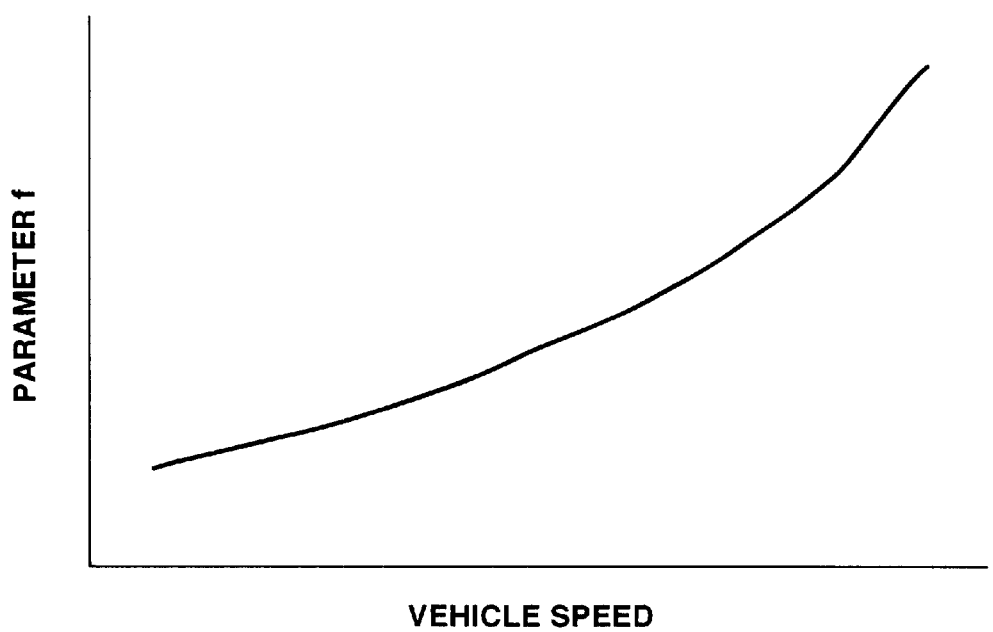
FIG. 20 is a diagram illustrating variations of a parameter f against vehicle speed (VSP).

FIGS. 16 to 20 illustrate variations in parameters a, b, g and f versus operating conditions. As shown in FIGS. 16 and 17, the parameters a and b stay unaltered over variations in line pressure, but they alter depending on oil temperature and load. The magnitude of alteration of each of the parameters a and b depending upon oil temperature and load is small. As shown in FIGS. 18 and 19, the parameter g is proportional to line pressure. The parameter g increases as oil temperature increases (see FIG. 18). The parameter g alters depending on engine load, but its magnitude is small (see FIG. 19). As shown in FIG. 20, the parameter f increases as vehicle speed increases. Thus, the CVT dynamics $G_{CVT}(s)$ is given by the equation Eq. 17 and the time constant $G_{LOGIC}$ is given by the programs of the control routine for ratio change. From the above, it is understood that the filter Gfil0(s) can be readily computed without any difficulty.

Figure 4C:
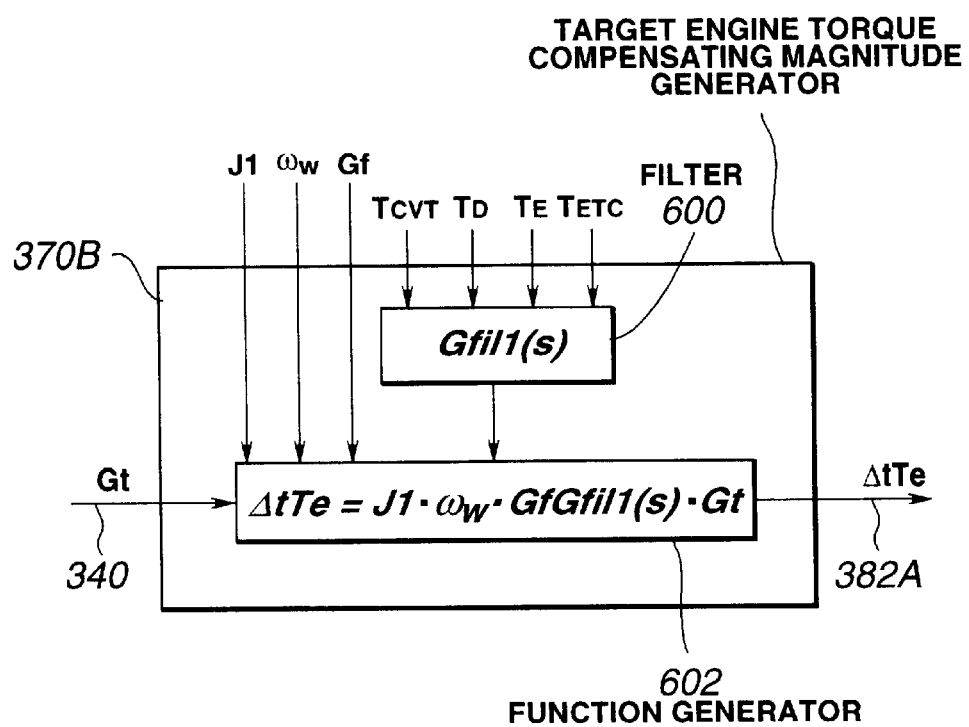
FIG. 4C is a similar view to FIG. 4B illustrating still another embodiment.

Referring to FIG. 4C, still another embodiment is described. FIG. 4C is substantially the same as FIG. 4B except that a target engine torque compensating magnitude generator 370B employs filter Gfil1(s) instead of the filter Gfil0(s) of the generator 370A. In this embodiment, it is assumed that transfer characteristic from ratio command Gi to actual ratio G can be expressed as, $$G=Q(s) \cdot e^{-T_{CVT} \cdot s} \cdot Gi \qquad \text{Eq. 18.}$$

where:
    Q(s) represents transfer characteristic from ratio command Gi to actual ratio G.

It is also assumed that ratio command Gi can be defined as, $$Gi=M(s) \cdot Gt \qquad \text{Eq. 19.}$$

Then, inertia torque ΔTe_inertia can be expressed as, $$\Delta Te\_inertia=J1 \cdot \omega_w \cdot Gf \cdot s \cdot Q(s) \cdot e^{T_{CVT} \cdot s} \cdot M(s) \cdot Gt \qquad \text{Eq. 20.}$$

Let us consider the case where inertia torque compensating magnitude ΔTe_control is computed from target ratio Gt. Using a phase-adjustment-pseudo-differential filter Gfil1(s), the inertia torque compensating magnitude ΔTe_control can be expressed as, $$\Delta Te\_control=J1 \cdot \omega_w \cdot Gf \cdot \{e^{-TD \cdot s}/(T_E \cdot s+1)\}\{1/(T_{ETC} \cdot s+1)\} \cdot Gfil1(s) \cdot Gt \qquad \text{Eq. 21.}$$

The filter Gfil1(s) for phase adjustment between the inertia torque ΔTe_inertia and the inertia toque compensating magnitude ΔTe_control can be extracted from the equations Eq. 20 and Eq. 21 as, $$Gfil1(s)=s \cdot Q(s) \cdot (T_E \cdot s+1)(T_{ETC} \cdot s+1) \cdot e^{-(T_{CVT}-T_D) \cdot s} \cdot M(s) \qquad \text{Eq. 22.}$$

Referring to FIG. 4C, the target engine torque compensating magnitude generator 370B includes a filter 600 and a function generator 602. In the filter 600, the Gfil1(s) is computed from the equation Eq. 22 and applied to the function generator 602 along with J1, $\omega_w$ and Gf. Target ratio Gt on line 340 is used as an input to the function generator 602. In the function generator 602, the filter Gfil1(s) is used to compute a target engine compensating magnitude ΔtTe that can be expressed as, $$\Delta tTe=J1 \cdot \omega_w \cdot Gf \cdot Gfil1(s) \cdot Gt \qquad \text{Eq. 23.}$$

The function generator 602 generates the target engine compensating magnitude ΔtTe on line 382A. The target engine torque compensating magnitude ΔtTe on line 382A is used as an input to a correction generator 384 (see FIG. 4A) wherein a throttle angle correction required to get the target engine torque compensating magnitude ΔtTe is found.

Figure 4D:
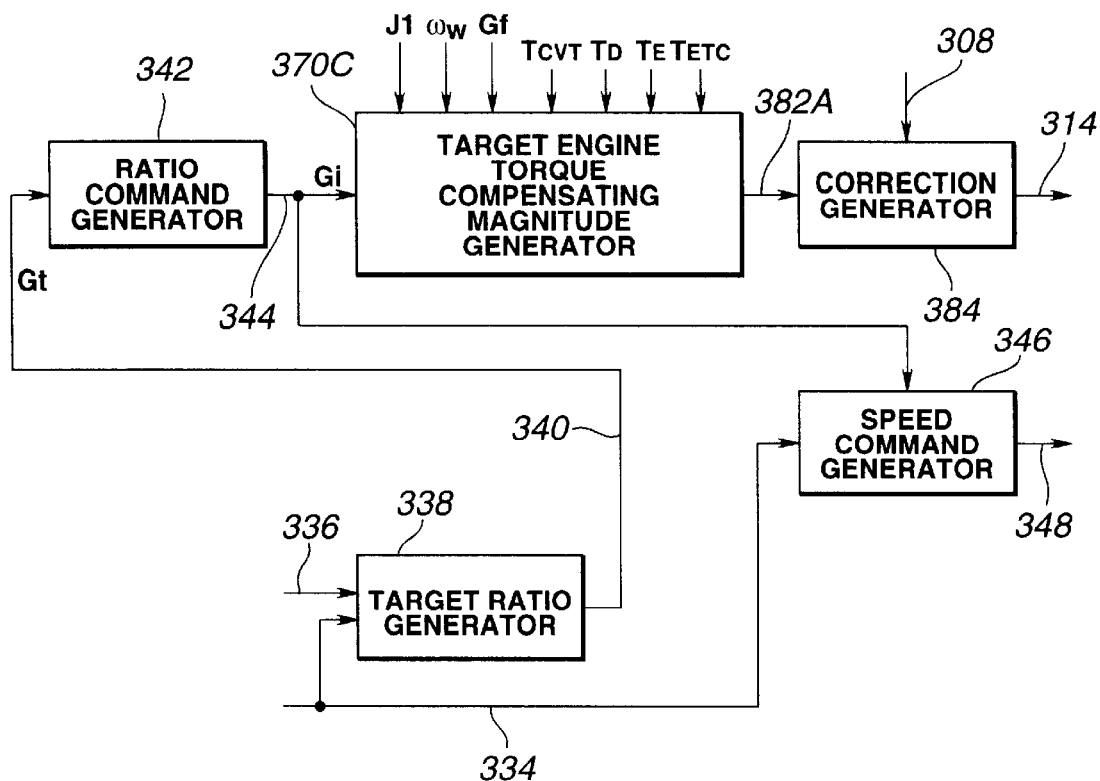
FIG. 4D is a portion of FIG. 4 but incorporating modification implementing further embodiment.
Figure 4E:
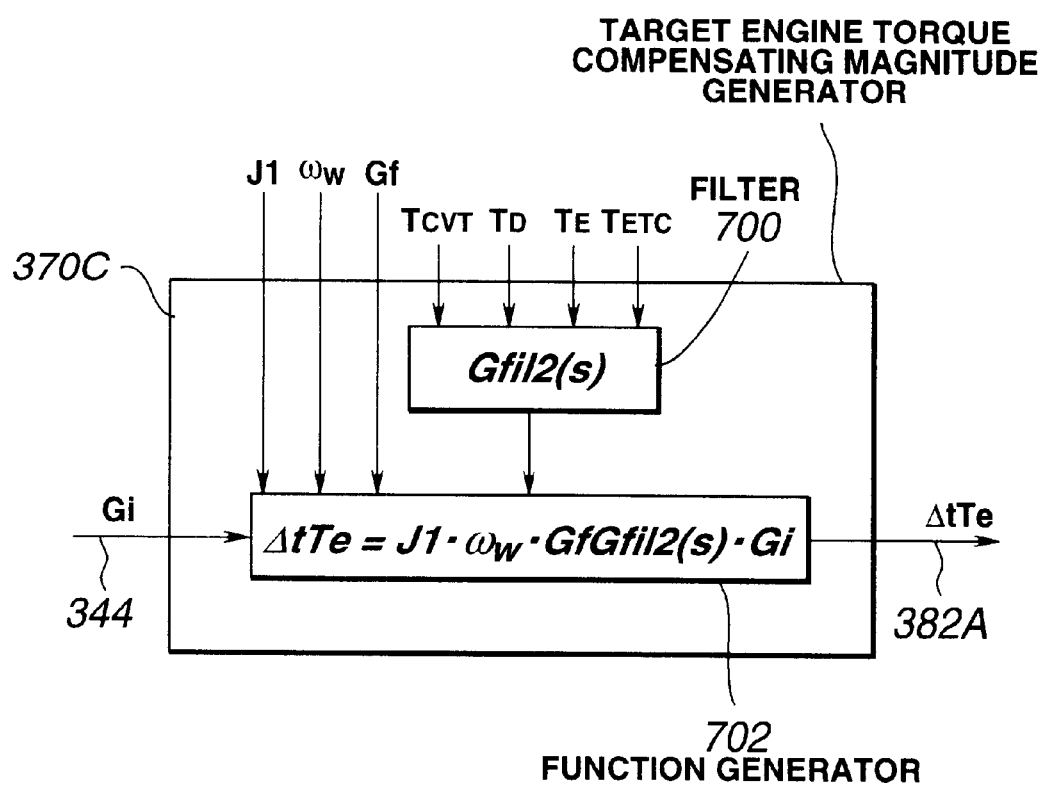
FIG. 4E is a portion of FIG. 4D.

Referring to FIGS. 4D and 4E, further embodiment is described. This embodiment stands based on the assumption that the equation Eq. 22 is realized without the term M(s) because differential element s is a proper fraction. In this case, inertia torque compensating magnitude can be computed based on ratio command Gi. A phase-adjustment-pseudo-differential filter Gfil2(s) can be expressed as, $$Gfil2(s)=s \cdot Q(s) \cdot (T_E \cdot s+1)(T_{ETC} \cdot s+1) \cdot e^{-(T_{CVT}-T_D) \cdot s} \qquad \text{Eq. 24.}$$

Referring to FIGS. 4D and 4E, a target engine torque compensating magnitude generator 370C includes a filter 700 and a function generator 702. In the filter 700, the filter Gfil2(s) is computed from the equation Eq. 24 and applied to the function generator 702 along with J1, $\omega_w$ and Gf. Ratio command Gi on line 344 is used as an input to the function generator 702. In the function generator 702, the filter Gfil2(s) is used to compute a target engine compensating magnitude ΔtTe that can be expressed as, $$\Delta tTe=J1 \cdot \omega_w \cdot Gf \cdot Gfil2(s) \cdot Gi \qquad \text{Eq. 25.}$$

In computing the filters Gfil1(s) and Gfil2(s), it must be taken into account that transfer characteristics of engine, throttle and CVT are subject to variations depending upon operating conditions of the engine-CVT drive train. In this case, varying values of parameters, such as $T_E$, $T_{ETC}$ and $T_D$ are plotted in controller memory as table data or map data against varying engine speed Ne, intake air quantity measures TP representing engine load, vehicle speed VSP, ratio G, line pressure PL of the transmission and oil temperature To. In computing the filters Gfil1(s) and Gfil2(s), the values of such parameters are varied depending upon operating conditions.

Figure 21:
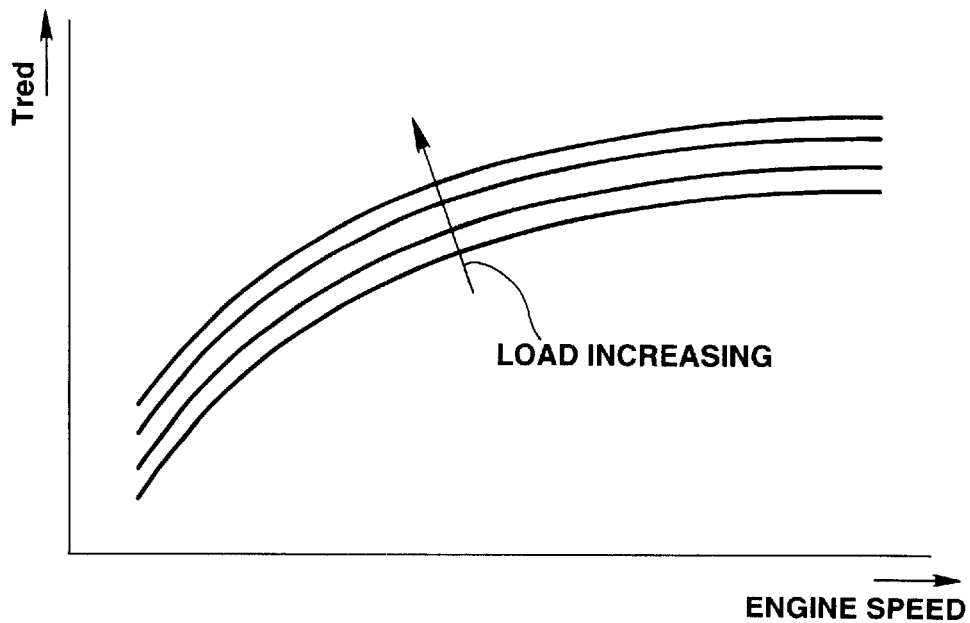
FIG. 21 is a diagram illustrating variations of a parameter $T_{red}$ against engine speed (Ne) and load.

Let us now consider the case where the filters Gfil0(s), Gfil1(s) and Gfil2(s) have high order and thus do not fit for on-line computation. In this case, a low-order approximation is known to be effective. Such approximation problem was considered by Brian D. O. Anderson and YI LIU in paper entitled "Controller Reduction: Concepts and Approaches" on pages 802–812, IEEE TRANSACTIONS ON AUTOMATIC CONTROL, VOL. 34, NO. 8, AUGUST 1989, which paper has been incorporated herein by reference in its entirety. The low-order approximation gives a phase-adjustment-pseudo-differential filter Gfil(s) that can be expressed as, $$Gfil(s)=s/(T_{red} \cdot s+1) \qquad \text{Eq. 26}$$

where:
    $T_{red}$ is a time constant that varies as shown in FIG. 21 depending upon engine speed and engine load.

Then, target engine torque compensating magnitude ΔtTe can be expressed based on ratio command Gi as, $$\Delta tTe=J1 \cdot \omega_w \cdot Gf \cdot Gfil(s) \cdot Gi \qquad \text{Eq. 27,}$$

or based on target ratio Gt as, $$\Delta tTe=J1 \cdot \omega_w \cdot Gf \cdot Gfil(s) \cdot Gt \qquad \text{Eq. 28.}$$

Figure 4F:
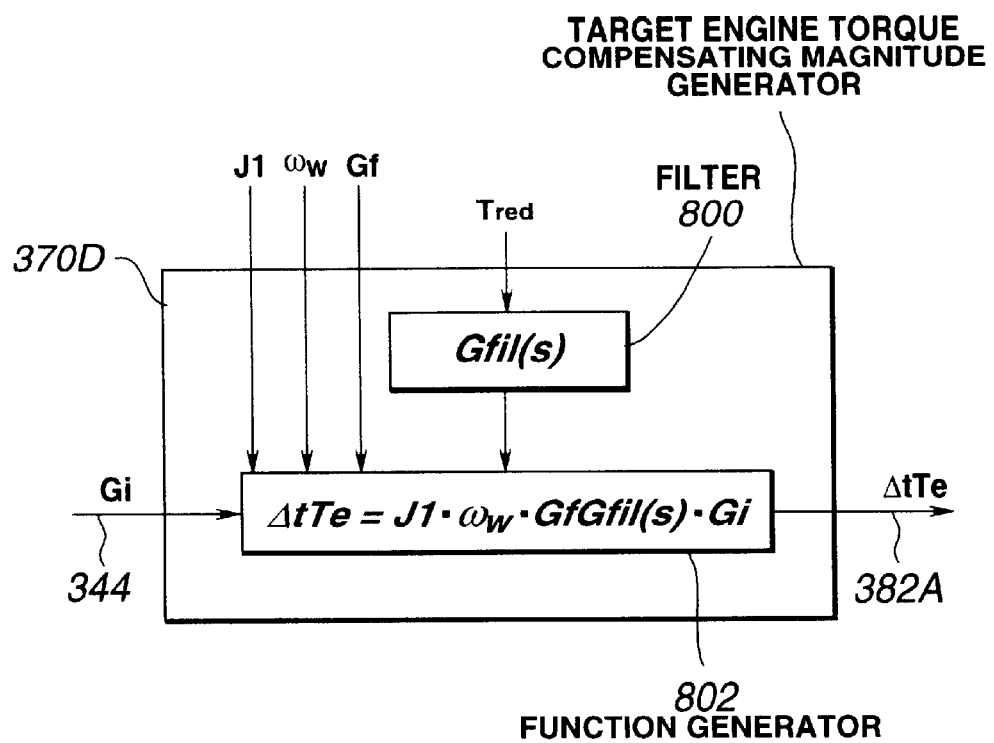
FIG. 4F is a similar view FIG. 4E illustrating another further embodiment.

Referring to FIG. 4F, a target engine torque compensating magnitude generator 370D includes a filter 800 and a function generator 802. In the filter 800, the filter Gfil(s) is computed from the equation Eq. 26 and applied to the function generator 802 along with J1, $\omega_w$ and Gf. Ratio command Gi on line 344 is used as an input to the function generator 802. In the function generator 802, the filter Gfil(s) is used to compute the target engine compensating magnitude ΔtTe that can be expressed as the equation Eq. 27.

Figure 4G:
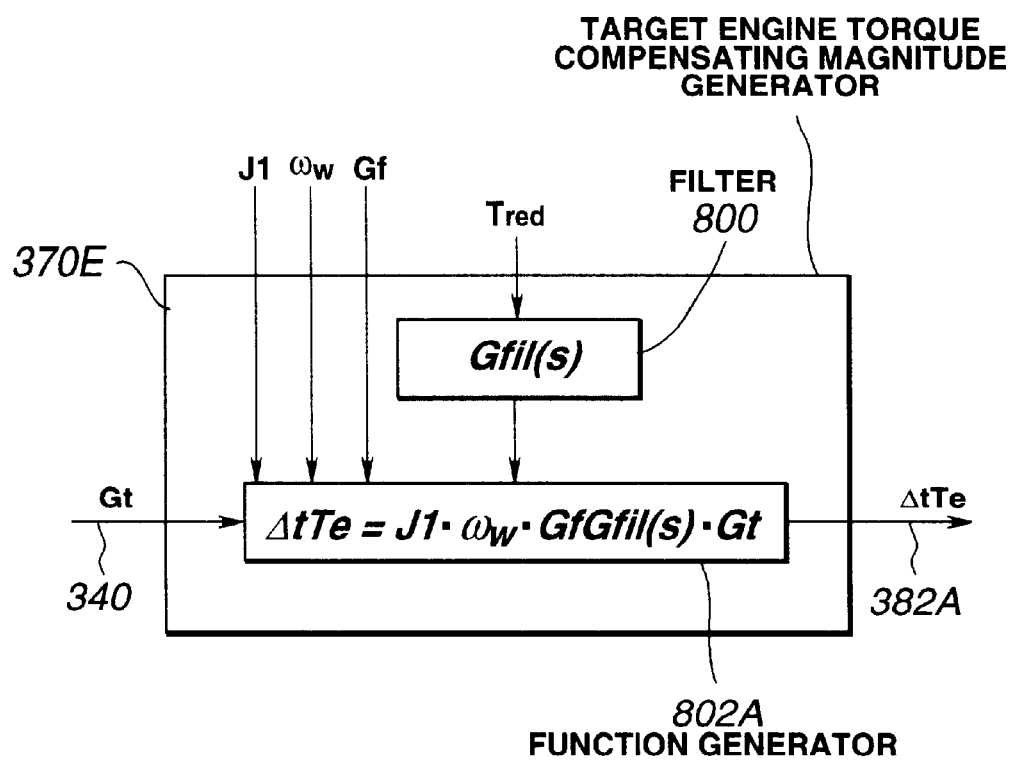
FIG. 4G is a similar view to FIG. 4B illustrating still further embodiment.

Referring to FIG. 4G, a target engine torque compensating magnitude generator 370E includes a filter 800 and a function generator 802A. In the filter 800, the filter Gfil(s) is computed from the equation Eq. 26 and applied to the function generator 802A along with J1, $\omega_w$ and Gf Target ratio Gt on line 340 is used as an input to the function generator 802A. In the function generator 802A, the filter Gfil(s) is used to compute the target engine compensating magnitude ΔtTe that can be expressed as the equation Eq. 28.

In computing the filter Gfil(s), a table look-up operation of FIG. 21 is performed based on the engine speed and engine load to find $T_{red}$ for making phase adjustment over the entire operating conditions.

Figure 22:
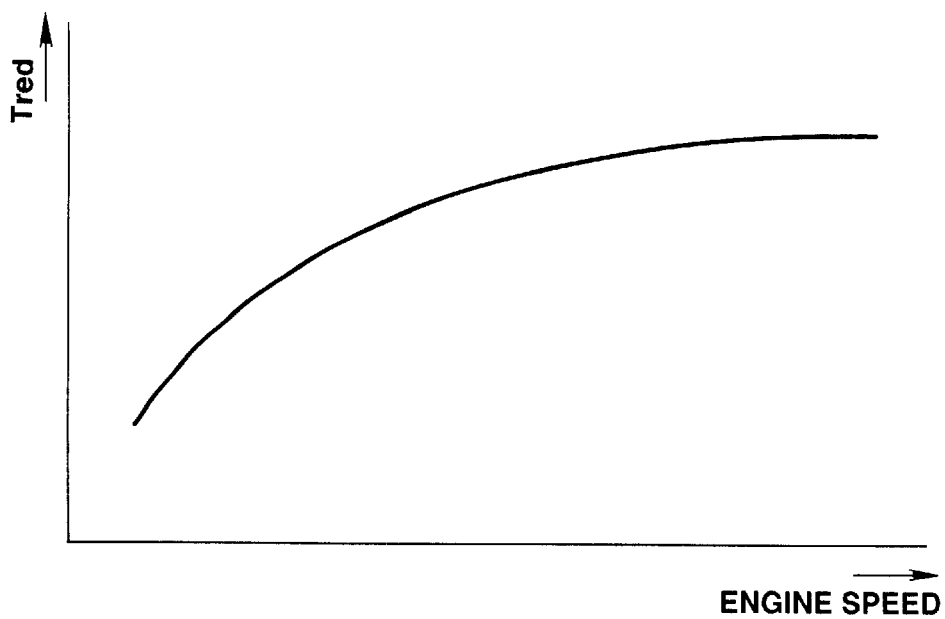
FIG. 22 is a diagram illustrating variations of the parameter $T_{red}$ against engine speed (Ne).

If variations of the time constant $T_{red}$ depending on the engine load is small and negligible, a table look-up operation of FIG. 22 is performed based on the engine speed to find $T_{red}$ in computing the filter Gfil(s) along with the equation Eq. 26.

According to the embodiments illustrated in FIGS. 4A, 4B, 4C and 4G, a pseudo-differential filter extracted to make phase adjustment of the inertia torque ΔTe__inertia and the inertia torque compensating magnitude ΔTe__control and target ratio Gt are used to give target engine torque compensating magnitude ΔtTe. The engine torque is controlled based on this magnitude ΔtTe, so that ratio change in CVT can be conducted without any deterioration in operating performance of the engine-CVT drive train.

According to the embodiments illustrated in FIGS. 4D, 4E and 4F, ratio change in CVT is performed based on ratio command Gi. Pseudo-differential filter extracted to make phase adjustment of the inertia torque ΔTe__inertia and the inertia torque compensating magnitude ΔTe__control and ratio command Gi are used to give target engine torque compensating magnitude ΔtTe. The engine torque is controlled based on this magnitude ΔtTe, so that ratio change in CVT can be conducted without any deterioration in operating performance of the engine-CVT drive train.

Many modifications to the above described invention will occur to those skilled in the art, and systems incorporating such modifications may fall within the scope of the invention which is defined by the claims.

The content of Japanese Patent Application No. 9-350874 are hereby incorporated in its entirety by reference.

What is claimed is:

1. A drive train control system including an engine having various engine speeds and a torque control element operable in response to a first control signal to control engine torque, a CVT including a ratio control arrangement having an actuator activated in response to a second control signal to establish various speed ratios between input and output shafts of the CVT, and a controller outputting the first and second control signals, the controller including a target ratio generator to generate a target ratio, an inertia torque generator to generate an inertia torque from the target ratio and a correction generator to generate a correction required to get engine torque change against the inertia torque, the controller generating the first control signal in response to the correction.

2. The drive train control system as claimed in claim 1, wherein the inertia torque generator computes time differential of the target ratio.

3. The drive train control system as claimed in claim 1, wherein the inertia torque generator processes the target ratio with a filter of pseudo time differential that uses a canonical model characteristic representing a desired change in ratio until the target ratio is accomplished.

4. The drive train control system as claimed in claim 1, wherein the controller includes a ratio command generator to generate a ratio command from the target ratio.

5. The drive train control system as claimed in claim 4, wherein the inertia torque generator computes a change in the ratio command.

6. The drive train control system as claimed in claim 4, wherein the ratio command generator uses the first order delay transfer function to compute the ratio command from the target ratio.

7. The drive train control system as claimed in claim 5, wherein the ratio command generator uses the first order delay transfer function to compute the ratio command from the target ratio.

8. The drive train control system as claimed in claim 4, wherein the ratio command generator computes from the target ratio the ratio command that changes in ramp manner.

9. The drive train control system as claimed in claim 5, wherein the ratio command generator computes from the target ratio the ratio command that changes in ramp manner.

10. The drive train control system as claimed in claim 4, wherein the ratio command generator uses a mathematical expression of a canonical model that represents a desired change in ratio until the target ratio is accomplished and a mathematical expression of an estimated model of a transfer function of the CVT in computing the ratio command from the target ratio.

11. The drive train control system as claimed in claim 5, wherein the ratio command generator uses a mathematical expression of a canonical model that represents a desired change in ratio until the target ratio is accomplished and a mathematical expression of an estimated model of a transfer function of the CVT in computing the ratio command from the target ratio.

12. The drive train control system as claimed in claim 4, wherein the ratio command generator uses a filter that represents a canonical model characteristic representing a desired change in ratio until the target ratio is accomplished in computing the ratio command from the target ratio.

13. The drive train control system as claimed in claim 5, wherein the ratio command generator uses a filter that represents a canonical model characteristic representing a desired change in ratio until the target ratio is accomplished in computing the ratio command from the target ratio.

14. A drive train control system including an engine having various engine speeds and a torque control element operable in response to a first control signal to control engine torque, a CVT including a ratio control arrangement having an actuator activated in response to a second control signal to establish various speed ratios between input and output shafts of the CVT, and a controller for outputting the first and second control signals, the controller being operative to generate a target ratio, the controller being operative to generate an inertia torque from the target ratio, the controller being operative to generate a correction required to get engine torque change against the inertia torque, and the controller being operative to generate the first control signal in response to the correction.

15. A control method for a vehicle drive train including an engine having various engine speeds and a torque control element operable in response to a first control signal to control engine torque, a CVT including a ratio control arrangement having an actuator activated in response to a second control signal to establish various speed ratios between input and output shafts of the CVT, and a controller for outputting the first and second control signals, the control method comprising:

generating a target ratio, generating an inertia torque from the target ratio, generating a correction required to get engine torque change against the inertia torque, and generating the first control signal in response to the correction.

16. A vehicle drive train control system comprising:

an engine having various engine speeds and a torque control element operable in response to a first control signal to control engine torque;

a CVT including a ratio control arrangement having an actuator activated in response to a second control signal to establish various speed ratios between input and output shafts of the CVT;

a road wheel driven by the output shaft of the CVT;

a controller outputting the first and second control signals;

an accelerator sensor;

a vehicle speed sensor;

an engine speed sensor;

a wheel speed sensor for the road wheel;

the controller being operative to input information of accelerator angle, vehicle speed, engine speed and wheel speed from the accelerator, vehicle speed, engine speed and wheel speed sensors, the controller being operative to generate a target speed from the accelerator angle and the vehicle speed;

the controller being operative to generate a target ratio from the target speed and the vehicle speed;

the controller being operative to generate angular wheel speed from the wheel speed;

the controller being operative to generate a ratio command from the target ratio and the angular wheel speed;

the controller being operative to generate a correction required to get engine torque change against the inertia torque; and the controller being operative to generate the first control signal in response to the correction.

17. The vehicle drive train control system as claimed in claim 16, wherein the controller being operative to compute the correction from the inertia torque and the engine speed.

18. A drive train control system including an engine having various engine speeds and a torque control element operable in response to a first control signal to control engine torque, a CVT including a ratio control arrangement having an actuator activated in response to a second control signal to establish various speed ratios between input and output shafts of the CVT, and a controller outputting the first and second control signals, the controller including a target ratio generator to generate a target ratio, a target engine torque compensating magnitude generator to generate a target engine torque compensating magnitude and a correction generator to generate a correction required to get the target engine torque compensating magnitude, the controller generating the first control signal in response to the correction, wherein the target engine torque compensating magnitude generator has a pseudo-differential filter extracted to make phase adjustment between inertia torque and inertia torque compensating magnitude and applies the pseudo differential to the target ratio in computing the target engine torque compensating magnitude.

19. A drive train control system including an engine having various engine speeds and a torque control element operable in response to a first control signal to control engine torque, a CVT including a ratio control arrangement having an actuator activated in response to a second control signal to establish varous speed ratios between input and output shafts of the CVT, and a controller outputting the first and second control signals, the controller including a target ratio generator to generate a target ratio, a ratio command generator to generate a ratio command from the target ratio, a target engine torque compensating magnitude generator to generate a target engine torque compensating magnitude and a correction generator to generate a correction required to get the target engine torque compensating magnitude, the controller generating the first control signal in response to the correction, wherein the target engine torque compensating magnitude generator has a pseudo-differential filter extracted to make phase adjustment between inertia torque and inertia torque compensating magnitude and applies the pseudo differential to the ratio command in computing the target engine torque compensating magnitude.

20. The vehicle drive train control system as claimed in claim 19, wherein the pseudo-differential filter is designed to advance phase of the inertia torque compensating magnitude by a magnitude corresponding to a delay from command for a change in engine torque to a moment when an actual change in engine torque takes place.

21. The vehicle drive train control system as claimed in claim 18, wherein said pseudo-differential filter involves a phase lag due to transfer characteristic from the target ratio to actual ratio in CVT.

22. The vehicle drive train control system as claimed in claim 19, wherein said pseudo-differential filter involves a phase lag due to transfer characteristic from the ratio command to actual ratio in CVT.

23. The vehicle drive train control system as claimed in claim 18, wherein a low-order approximation is used to realize the pseudo-differential filter.

24. The vehicle drive train control system as claimed in claim 18, wherein coefficient of mathematical expression of the pseudo-differential filter is given based on operating conditions of the vehicle drive train.

25. The vehicle drive train control system as claimed in claim 24, wherein the coefficient is given based on operating conditions of the engine.

26. The vehicle drive train control system as claimed in claim 18, wherein the pseudo-differential filter is designed to advance phase of the inertia torque compensating magnitude by a magnitude corresponding to a delay from command for a change in engine torque to a moment when an actual change in engine torque takes place.

27. The vehicle drive train control system as claimed in claim 19, wherein a low-order approximation is used to realize the pseudo-differential filter.

28. The vehicle drive train control system as claimed in claim 19, wherein coefficient of mathematical expression of the pseudo-differential filter is given based on operating conditions of the vehicle drive train.

* * * * *